United States Patent
Jiang et al.

(10) Patent No.: US 12,254,158 B2
(45) Date of Patent: Mar. 18, 2025

(54) TOUCH LAYER AND TOUCH DISPLAY APPARATUS

(71) Applicants: Chongqing BOE Display Technology Co., Ltd., Chongqing (CN); BOE TECHNOLOGY GROUP CO., LTD., Beijing (CN)

(72) Inventors: Liqing Jiang, Beijing (CN); Guiyu Zhang, Beijing (CN); Qiang Wang, Beijing (CN); Shuai Liu, Beijing (CN); Shukui Yang, Beijing (CN)

(73) Assignees: CHONGQING BOE DISPLAY TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/248,170

(22) PCT Filed: Apr. 8, 2022

(86) PCT No.: PCT/CN2022/085948
§ 371 (c)(1),
(2) Date: Apr. 6, 2023

(87) PCT Pub. No.: WO2023/193261
PCT Pub. Date: Oct. 12, 2023

(65) Prior Publication Data
US 2024/0370127 A1 Nov. 7, 2024

(51) Int. Cl.
*G06F 3/044* (2006.01)
(52) U.S. Cl.
CPC .......... *G06F 3/0446* (2019.05); *G06F 3/0445* (2019.05)

(58) Field of Classification Search
CPC ......... G06F 3/0446; G06F 2203/04111; G06F 3/0445; G06F 2203/04103
See application file for complete search history.

(56) References Cited

U.S. PATENT DOCUMENTS

| | | | |
|---|---|---|---|
| 2014/0347579 A1* | 11/2014 | Jang ...................... | G06F 3/0446 349/12 |
| 2015/0001060 A1* | 1/2015 | Kim ...................... | G06F 3/0445 200/600 |

(Continued)

FOREIGN PATENT DOCUMENTS

| | | |
|---|---|---|
| CN | 104714683 A | 6/2015 |
| CN | 107450772 A | 12/2017 |

(Continued)

*Primary Examiner* — Van N Chow
(74) *Attorney, Agent, or Firm* — XSENSUS LLP

(57) ABSTRACT

A touch layer includes a first conductive pattern layer, a second conductive pattern layer and an insulation layer. The first conductive pattern layer includes electrode blocks arranged in a first direction, a second touch electrode strip extending along a second direction, and connecting pattern(s). The second conductive pattern layer includes bridge group(s). Two adjacent electrode blocks and a connecting pattern located therebetween are electrically connected by a bridge group, which includes connecting bridges. The insulation layer extends between the first conductive pattern layer and the second conductive pattern layer, and is provided therein with first openings and second openings. An electrode block in the two adjacent electrode blocks is electrically connected to the connecting pattern through connecting bridge(s) in the bridge group; a connecting bridge in the connecting bridge(s) is electrically connected to the electrode block at first opening(s) and is electrically connected to the connecting pattern at second opening(s).

20 Claims, 13 Drawing Sheets

(56) References Cited

U.S. PATENT DOCUMENTS

| | | | |
|---|---|---|---|
| 2017/0068365 A1* | 3/2017 | Liu | ........................ G06V 40/13 |
| 2020/0033967 A1 | 1/2020 | Ang et al. | |
| 2021/0165528 A1* | 6/2021 | You | ....................... G06F 3/0412 |
| 2021/0242284 A1* | 8/2021 | Kim | ....................... H10K 71/00 |
| 2021/0357078 A1* | 11/2021 | Yuan | ..................... G06F 3/0446 |
| 2022/0197419 A1 | 6/2022 | Sun et al. | |
| 2022/0383830 A1* | 12/2022 | Su | .......................... H01L 27/124 |

FOREIGN PATENT DOCUMENTS

| | | | |
|---|---|---|---|
| CN | 108920010 A | 11/2018 |
| CN | 110764659 A | 2/2020 |
| CN | 114072756 A | 2/2022 |
| CN | 114077328 A | 2/2022 |
| EP | 2530565 A2 | 12/2012 |

\* cited by examiner

TOUCH LAYER AND TOUCH DISPLAY APPARATUS

CROSS-REFERENCE TO RELATED APPLICATION

This application is a national phase entry under 35 USC 371 of International Patent Application No. PCT/CN2022/085948, filed on Apr. 8, 2022, which is incorporated herein by reference in its entirety.

TECHNICAL FIELD

The present disclosure relates to the field of display technologies, and in particular, to a touch layer and a touch display apparatus.

BACKGROUND

A touch structure has types such as a capacitive type, a resistive type, an infrared type or a surface acoustic wave type. A capacitive touch screen works by utilizing a current induction phenomenon in a human body, supports multi-point touch, and has advantages such as wear resistance, long service life, low power consumption. Therefore, the capacitive touch screen is developed quickly.

A capacitive touch structure is classified into a mutual capacitive touch structure and a self-capacitive touch structure. The mutual capacitive touch structure may include two groups of electrode strips (for example, the two groups of electrode strips include a group of touch scan electrode strips and a group of touch sense electrode strips) that are arranged crosswise, and a plurality of capacitances are formed near positions where the two groups of electrode strips cross each other. When a finger touches the screen, capacitances of some capacitors near a touch point are affected. Based on these changes in capacitance, a touch position may be determined.

SUMMARY

In an aspect, a touch layer is provided. The touch layer includes a first conductive pattern layer, a second conductive pattern layer and an insulation layer. The first conductive pattern layer includes a plurality of electrode blocks that are arranged in a first direction, a second touch electrode strip extending along a second direction, and at least one connecting pattern. The first direction intersects the second direction; the second touch electrode strip passes a space between two adjacent electrode blocks in the plurality of electrode blocks and is insulated from the two adjacent electrode blocks; a connecting pattern in the at least one connecting pattern is located between the two adjacent electrode blocks and is insulated from the second touch electrode strip. The second conductive pattern layer and the first conductive pattern layer are stacked, and the second conductive pattern layer includes at least one bridge group; the plurality of electrode blocks and the at least one connecting pattern are electrically connected by the at least one bridge group, so as to form a first touch electrode strip. The two adjacent electrode blocks and the connecting pattern are electrically connected by a bridge group in the at least one bridge group, and the bridge group includes a plurality of connecting bridges. The insulation layer extends between the first conductive pattern layer and the second conductive pattern layer, and the insulation layer is provided therein with a plurality of first openings and a plurality of second openings. An electrode block in the two adjacent electrode blocks is electrically connected to the connecting pattern through at least one connecting bridge in the bridge group; a connecting bridge in the at least one connecting bridge is electrically connected to the electrode block at at least one first opening in the insulation layer and is electrically connected to the connecting pattern at at least one second opening in the insulation layer.

In some embodiments, a dimension of the connecting pattern in the second direction is greater than a dimension of the connecting pattern in the first direction.

In some embodiments, the connecting pattern includes: a first edge, a second edge, a third edge and a fourth edge that are sequentially connected end to end. The first edge and the third edge are opposite in the second direction, and the second edge and the fourth edge are opposite in the first direction. At least one of the first edge, the second edge, the third edge and the fourth edge is in a shape of a polyline, and an edge in the shape of the polyline is a polyline-shaped edge.

In some embodiments, the connecting pattern has at least one convex tooth in the polyline-shaped edge.

In some embodiments, the first edge is the polyline-shaped edge, the connecting pattern has at least one first convex tooth in the first edge, and a vertex angle of a first convex tooth in the at least one first convex tooth is an acute angle; the first convex tooth is one of the at least one convex tooth.

In some embodiments, the second edge is the polyline-shaped edge, the connecting pattern has at least one second convex tooth in the second edge, and a vertex angle of a second convex tooth in the at least one second convex tooth is an obtuse angle; the second convex tooth is one of the at least one convex tooth.

In some embodiments, the third edge is the polyline-shaped edge, the connecting pattern has at least one third convex tooth in the third edge, and a vertex angle of a third convex tooth in the at least one third convex tooth is an acute angle; the third convex tooth is one of the at least one convex tooth.

In some embodiments, the fourth edge is the polyline-shaped edge, the connecting pattern has at least one fourth convex tooth in the fourth edge, and a vertex angle of a fourth convex tooth in the at least one fourth convex tooth is an obtuse angle; the fourth convex tooth is one of the at least one convex tooth.

In some embodiments, the vertex angle of the first convex tooth in the first edge is in a range of 30° to 90°, inclusive.

In some embodiments, the vertex angle of the second convex tooth in the second edge is in a range of 120° to 145°, inclusive.

In some embodiments, the vertex angle of the third convex tooth in the third edge is in a range of 30° to 90°, inclusive.

In some embodiments, the vertex angle of the fourth convex tooth in the fourth side is in a range of 120° to 145°, inclusive.

In some embodiments, the electrode block includes a fifth edge, the fifth edge and the second edge are opposite in the first direction and adjacent in position, and a width of a gap between the fifth edge and the second edge is approximately uniform.

In some embodiments, the electrode block includes a sixth edge extending along a third direction, the second touch electrode strip includes a seventh edge extending along the third direction, and the sixth edge and the seventh edge are adjacent in position; the third direction intersects the first direction and the second direction; at least one of the sixth edge and the seventh edge is in a shape of a polyline.

In some embodiments, a bending angle, at a bending position, of a polyline-shaped edge in the sixth edge and the seventh edge is an obtuse angle.

In some embodiments, a projection, in a thickness direction of the touch layer, of the connecting bridge on the insulation layer covers a first opening in the at least one first opening.

In some embodiments, the projection, in the thickness direction of the touch layer, of the connecting bridge on the insulation layer covers a second opening in the at least one second opening.

In some embodiments, the projection, in the thickness direction of the touch layer, of the connecting bridge on the insulation layer covers the first opening in the at least one first opening; and the projection, in the thickness direction of the touch layer, of the connecting bridge on the insulation layer covers the second opening in the at least one second opening.

In some embodiments, a first opening in the at least one first opening is divided into a first region and a second region; a projection, in a thickness direction of the touch layer, of the connecting bridge on the insulation layer is an orthographic projection of the connecting bridge, and the orthographic projection of the connecting bridge covers the first region and does not cover the second region.

In some embodiments, an end of the orthographic projection of the connecting bridge is located in the first opening.

In some embodiments, a second opening in the at least one second opening is divided into a third region and a fourth region; a projection, in a thickness direction of the touch layer, of the connecting bridge on the insulation layer is an orthographic projection of the connecting bridge, and the orthographic projection of the connecting bridge covers the third region and does not cover the fourth region.

In some embodiments, the second touch electrode strip is provided with at least one third opening therein, and the connecting pattern is located in a third opening in the at least one third opening.

In some embodiments, a width of a gap between the third opening and the connecting pattern is substantially uniform.

In some embodiments, a width of the connecting bridge is substantially uniform, and the connecting bridge is line-shaped.

In some embodiments, the width of the connecting bridge is substantially uniform, and the connecting bridge is polyline-shaped.

In some embodiments, the width of the connecting bridge is substantially uniform, and the connecting bridge is wave-shaped.

In some embodiments, a distance between any two adjacent connecting bridges in the bridge group in the second direction is greater than or equal to 100 µm.

In some embodiments, the touch layer further includes dummy electrodes; a dummy electrode in the dummy electrodes is located between the electrode block and the second touch electrode strip.

In another aspect, a touch display apparatus is provided. The touch display apparatus includes the touch layer as described in any one of the embodiments above.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these accompanying drawings. In addition, the accompanying drawings in the following description may be regarded as schematic diagrams, but are not limitations on actual sizes of products, actual processes of methods and actual timings of signals involved in the embodiments of the present disclosure.

DETAILED DESCRIPTION

Figure 1A:
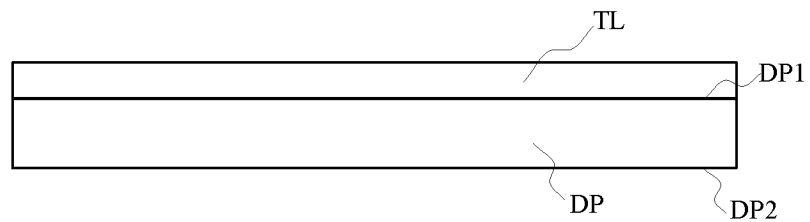
FIG. 1A is a side view of a touch display apparatus provided in some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person having ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the terms "a plurality of", "the plurality of" and "multiple" each mean two or more unless otherwise specified.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The phrase "applicable to" or "configured to" used herein means an open and inclusive expression, which does not exclude devices that are applicable to or configured to perform additional tasks or steps.

In addition, the phase "based on" used is meant to be open and inclusive, since a process, step, calculation or other action that is "based on" one or more of the stated conditions or values may, in practice, be based on additional conditions or value exceeding those stated.

As used herein, the term such as "about", "substantially" or "approximately" includes a stated value and an average value within an acceptable range of deviation of a particular value, and the acceptable range of deviation is determined by a person of ordinary skill in the art in view of the measurement in question and errors associated with measurement of a particular quantity (i.e., the limitation of the measurement system).

As used herein, the term such as "parallel", "perpendicular" or "equal" includes a stated condition and a condition similar to the stated condition. A range of the similar condition is within an acceptable range of deviation, and the acceptable range of deviation is determined by a person of ordinary skill in the art in view of measurement in question and errors associated with measurement of a particular quantity (i.e., the limitation of the measurement system). For example, the term "parallel" includes absolute parallelism and approximate parallelism, and an acceptable range of deviation of the approximate parallelism may be, for example, a deviation within 5°. The term "perpendicular" includes absolute perpendicularity and approximate perpendicularity, and an acceptable range of deviation of the approximate perpendicularity may also be, for example, a deviation within 5°. The term "equal" includes absolute equality and approximate equality, and an acceptable range of deviation of approximate equality may be, for example, that a difference between two equals is less than or equal to 5% of any one of the two equals.

It will be understood that, in a case where a layer or component is referred to as being on another layer or a substrate, it may be that the layer or component is directly on the another layer or substrate; or it may be that intermediate layer(s) exist between the layer or component and the another layer or substrate.

Exemplary embodiments are described herein with reference to sectional views and/or plan views as idealized exemplary drawings. In the accompanying drawings, thicknesses of layers and sizes of regions are enlarged for clarity. Variations in shape relative to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown to have a rectangular shape generally has a feature of being curved. Therefore, the regions shown in the accompanying drawings are schematic in nature, and their shapes are not intended to show actual shapes of regions in an apparatus, and are not intended to limit the scope of the exemplary embodiments.

For a mutual capacitive touch structure, a touch scan electrode strip (which may be abbreviated as TX) and a touch sense electrode strip (which may be abbreviated as RX) are crossed to form a capacitor. The two electrode strips are insulated from each other at a crossing position. For example, an insulation layer exists between the two electrode strips at the crossing position. Based on this, such a design of stacked layers at the crossing position may cause a problem that patterns at the crossing position are visible (for example, the crossing position is visually apparent, or a shadow at the crossing position is hard to be eliminated). Moreover, a display apparatus including the mutual capacitive touch structure has the problem no matter the display apparatus is in a screen-off state or a screen-on state.

In order to solve the problem, some embodiments of the present disclosure provide a touch display apparatus. The touch display apparatus may be a product having a touch function and an image display function. For example, the touch display apparatus may be a display having a touch function, a television, a personal computer, a notebook computer, a billboard, a digital photo frame, and a laser printer having a display function, a telephone, a mobile phone, a digital camera, an electronic picture screen, a camcorder, a viewfinder, a monitor, a navigator, a vehicle, a large-area wall, an information search device (e.g., a business search device in a department such as an electronic government, a bank, a hospital or an electric power department), a vehicle-mounted display or the like. As another example, the touch display apparatus may be a touch display panel (which may also be referred to as a touch display screen). As another example, the touch display apparatus may include other electronic devices (such as a touch chip and a main board) in addition to the touch display panel. The touch chip is coupled to the touch display panel and configured to determine a touch position (e.g., touch coordinates) based on a touch signal provided by the touch display panel. The main board is coupled to the touch display panel and configured to output corresponding image data to the touch display panel based on the touch position determined by the touch chip.

Figure 1B:
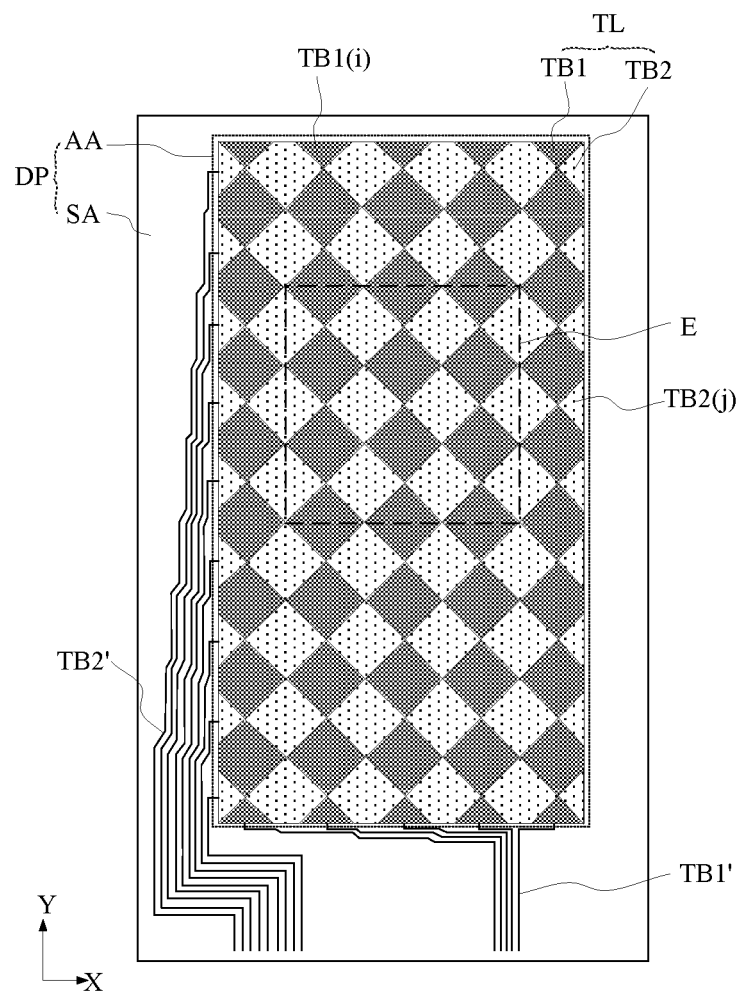
FIG. 1B is a top view of FIG. 1A.

FIG. 1A is a side view of the touch display apparatus provided in some embodiments of the present disclosure; FIG. 1B is a top view of FIG. 1. Referring to FIGS. 1A and 1B, the touch display apparatus includes a display panel DP and a touch layer TL. An assembly constituted by the display panel DP and the touch layer TL may also be referred to as the touch display panel.

Referring to FIG. 1A, the display panel DP is a screen having a display function, and may be coupled to the main board. The display panel DP is configured to receive the image data sent from the main board and display a corresponding image. For example, the display panel DP may be an organic light-emitting diode (OLED) display panel, a quantum dot light-emitting diode (QLED) display panel, a tiny light-emitting diode (a tiny LED, including a mini LED or a micro LED) display panel, etc.

The display panel DP has a display surface DP1 and a non-display surface DP2 that are opposite in a thickness direction of the display panel DP. Users can view a picture facing the display surface DP1 of the display panel DP. That is, a side of the display surface DP1 away from the non-display surface DP2 of the display panel DP is a side for the users to view the picture, and this side is hereinafter referred to as a display side of the display panel DP.

With continued reference to FIG. 1A, the touch layer TL is configured to provide the touch signal, and the touch signal may reflect the touch position of the user on the display panel DP. The touch layer TL may be coupled to the touch chip to provide the touch signal to the touch chip.

In some possible implementations, the touch layer TL may be located on the display side of the display panel DP. The touch layer TL may be a component independent of the display panel DP. For example, the display panel DP and the touch layer TL are formed separately and then bonded together by an adhesive such as an optical adhesive. The touch layer TL may also be of a structure integrated on the display panel DP. For example, the display panel DP serves as a substrate, and the touch layer TL is formed on the display surface DP1 of the display panel DP. In this case, the touch layer TL is in direct contact with the display surface DP1 of the display panel DP. For example, the display panel DP is an OLED display panel or a QLED display panel, and the display panel DP may include a display substrate and an encapsulation layer covering the display substrate; the touch layer TL may be formed on the encapsulation layer.

In some other possible implementations, the touch layer may also be located inside the display panel. For example, the display panel includes a first substrate and a second substrate that are disposed oppositely, and the touch layer may be located between the first substrate and the second substrate.

Referring to FIG. 1B, the display panel DP has a display area AA and a non-display area SA. The display area AA is an area of the display panel DP for displaying the image, and the non-display area SA is an area of the display panel DP other than the display area AA. The non-display area SA may be located at at least one side (e.g., one side or multiple sides) of the display area AA. For example, the non-display area SA may be disposed around the display area AA.

For example, the display area AA may be in a shape of a rectangle, or may be in other shape similar to the rectangle such as a rectangle with rounded corners. Based on this, the display area AA has two sides intersecting (e.g., being perpendicular to) each other. For convenience of description, a rectangular coordinate system is established by taking extending directions of the two sides as X-axis and Y-axis, respectively.

With continued reference to FIG. 1B, the touch layer TL may include: a group of first touch electrode strips TB1 (including at least one first touch electrode strip TB1, such as a plurality of first touch electrode strips TB1) and a group of second touch electrode strips TB2 (including at least one second touch electrode strip TB2, such as a plurality of second touch electrode strips TB2) that are crossed and insulated from each other. For example, the touch layer TL includes N first touch electrode strips TB1. N is greater than or equal to 1 (i.e., N≥1). For example, N is equal to 1 (i.e., N=1). As another example, N is greater than or equal to 2 (i.e., N≥2). In the case where N is greater than or equal to 2 (i.e., N≥2), the N first touch electrode strips TB1 may be arranged at intervals along a second direction X. For convenience of description below, any one of the first touch electrode strips TB1 is denoted as TB1($i$), and i is greater than or equal to 1 and less than or equal to N (i.e., N≥i≥1). The touch layer TL also includes M second touch electrode strips TB2. M is greater than or equal to 1 (i.e., M≥1). For example, M is equal to 1 (i.e., M=1). As another example, M is greater than or equal to 2 (i.e., M≥2). In the case where M is greater than or equal to 2 (i.e., M≥2), the M second touch electrode strips TB2 may be arranged at intervals along a first direction Y. A second touch electrode strip TB2 (e.g., each second touch electrode strip TB2) may be of a one-piece structure (i.e., a pattern). For convenience of description below, any one of the second touch electrode strips TB2 is denoted as TB2($j$), and j is greater than or equal to 1 and less than or equal to M (i.e., M≥j≥1). The first direction X and the second direction Y intersect each other. For example, the first direction X and the second direction Y are perpendicular to each other. For example, the first direction Y is a direction indicated by the Y-axis, and the second direction X is a direction indicated by the X-axis. Of course, the first direction Y and the second direction X shown in FIG. 1B may be interchanged.

For example, the first touch electrode strip TB1 serves as a touch scan electrode strip (TX), and the second touch electrode strip TB2 serves as a touch sense electrode strip (RX). As another example, the first touch electrode strip TB1 serves as a touch sense electrode strip, and the second touch electrode strip TB2 serves as a touch scan electrode strip.

The group of first touch electrode strips TB1 and the group of second touch electrode strips TB2 may both correspond to the display area AA of the display panel DP. That is, orthographic projections of each first touch electrode strip TB1 and each second touch electrode strip TB2 on the display panel DP are at least partially (i.e., partially or completely) located in the display area AA, so that the touch layer TL can sense a touch operation corresponding to the display area AA.

The phrase "an orthographic projection of A on B" herein means a projection of A on B in a direction perpendicular to a plane where B is located. For example, an orthographic projection of a first touch electrode strip TB1 on the display panel DP refers to a projection of the first touch electrode strip TB1 on the display panel DP in the thickness direction of the display panel DP.

In addition, the group of first touch electrode strips TB1 may be coupled to the touch chip through a group of first leads TB1', and the group of second touch electrode strips TB2 may be coupled to the touch chip through a group of second leads TB2'. The group of first leads TB1' and the group of second leads TB2' may be included in the touch layer TL or disposed in the display panel DP.

Figure 2:
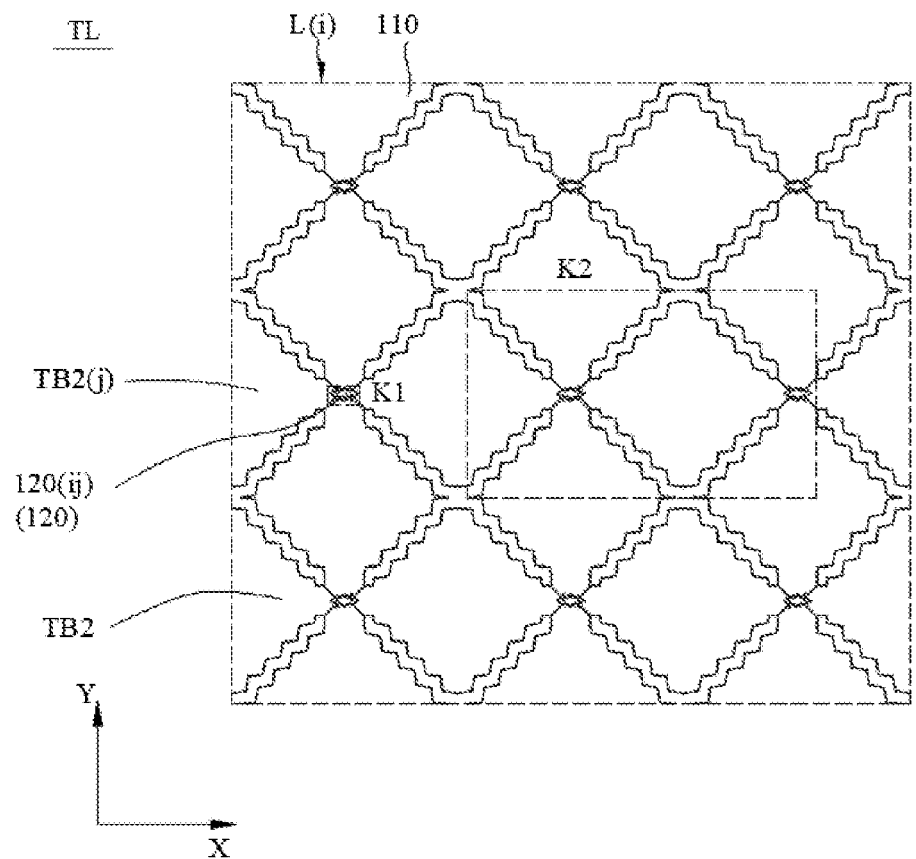
FIG. 2 is an enlarged view of the region E of a touch layer in FIG. 1B.
Figure 3:
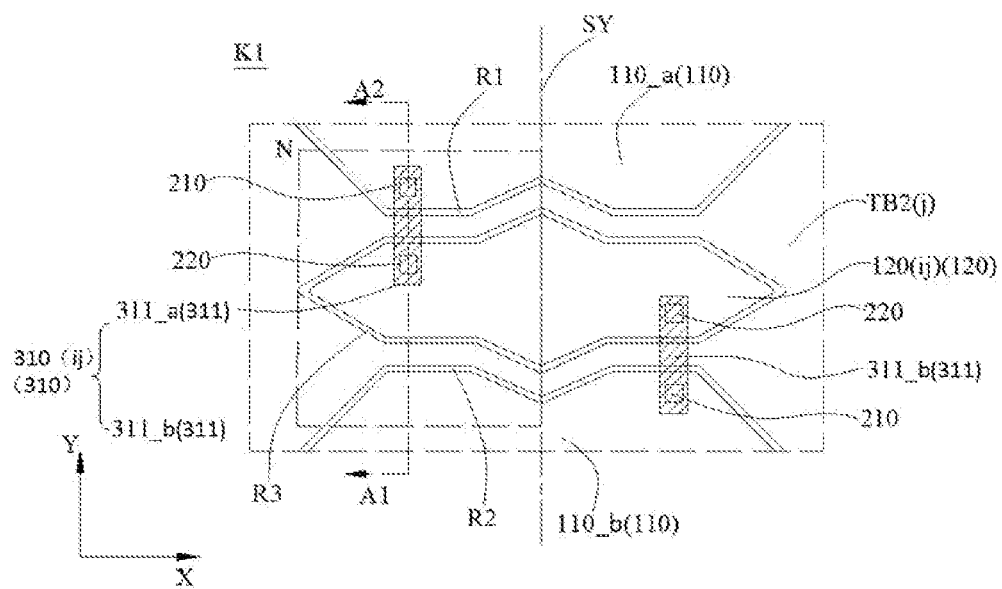
FIG. 3 is an enlarged view of the region K1 in FIG. 2.
Figure 4A:
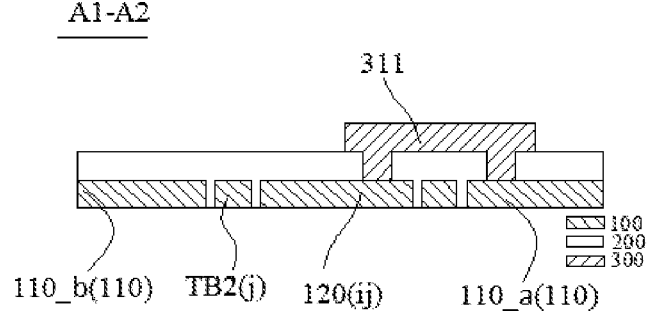
FIG. 4A is a sectional view taken along the line A1-A2 in FIG. 3.
Figure 4B:
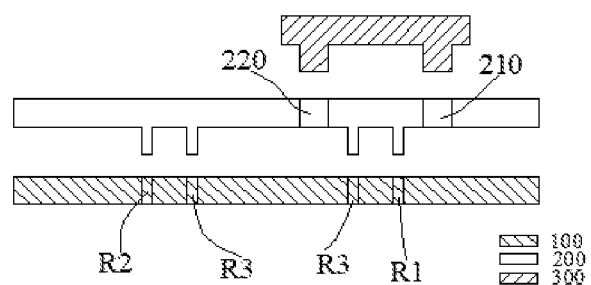
FIG. 4B is an exploded view of FIG. 4A.

FIG. 2 is an enlarged view of the region E of the touch layer in FIG. 1B; FIG. 3 is an enlarged view of the region K1 in FIG. 2; FIG. 4A is a sectional view taken along the line A1-A2 in FIG. 3; and FIG. 4B is an exploded view of FIG. 4A.

Referring to FIGS. 2 to 4B, some embodiments of the disclosure provide the touch layer TL. The touch layer TL includes: a first conductive pattern layer 100, an insulation layer 200 and a second conductive pattern layer 300 that are stacked. Thus, the group of first touch electrode strips TB1 and the group of second touch electrode strips TB2 in FIG. 1B may be insulated from each other.

The first conductive pattern layer 100 includes a plurality of electrode blocks 110 that are arranged in the first direction Y. The electrode blocks 110 are arranged in a line of electrodes L(i). For example, in a case where N first touch electrode strips TB1 (shown in FIG. 1B) need to be arranged in the touch layer TL, the first conductive pattern layer 100 includes N lines of electrodes, and any one line of electrodes is denoted as L(i), where i is greater than or equal to 1 and less than or equal to N (i.e., N≥i≥1). In the case where N is greater than or equal to 2 (i.e., N≥2), N lines of electrodes may be arranged at intervals along the second direction X. Two adjacent electrode blocks 110 in the line of electrodes L(i) are referred to as a first electrode block 110_a and a second electrode block 110_b. For example, the first electrode block 110_a is located on an upper side (a side indicated by the arrow in the first direction Y in FIG. 2) of a connecting pattern 120, and the second electrode block 110_b is located on a lower side (a side opposite to the upper side) of the connecting pattern 120. Of course, positions of the first electrode block 110_a and the second electrode block 110_b may be interchanged.

The first conductive pattern layer 100 further includes at least one second touch electrode strip TB2 extending along the second direction X. For example, the first conductive pattern layer 100 includes M second touch electrode strips TB2, any one of the second touch electrode strips TB2 is denoted as TB2(j), where j is greater than or equal to 1 and less than or equal to M (i.e., M≥j≥1). A second touch-electrode strip TB2 (e.g., each second touch electrode strip TB2) may be of the one-piece structure. The second touch electrode strip TB2(j) passes a space between the two adjacent electrode blocks (the first electrode block 110_a and the second electrode block 110_b), and is insulated from the two adjacent electrode blocks (the first electrode block 110_a and the second electrode block 110_b). For example, a first insulation gap R1 exists between the second touch electrode strip TB2(j) and the first electrode block 110_a, and the second touch electrode strip TB2(j) and the first electrode block 110_a are insulated from each other through the first insulation gap R1. A second insulation gap R2 exists between the second touch electrode strip TB2(j) and the second electrode block 110_b, and the second touch electrode strip TB2(j) and the second electrode block 110_b are insulated from each other through the second insulation gap R2.

The first conductive pattern layer 100 further includes at least one connecting pattern 120 (e.g., one or a plurality of connecting patterns 120). For example, a connecting pattern 120 may be disposed between every two adjacent electrode blocks 110 in the line of electrodes L(i). For convenience of description below, the connecting pattern 120 at a crossing position between the line of electrodes L(i) and the second touch electrode stripe TB2(j) is denoted as 120(ij). The connecting pattern 120(ij) is located between the first electrode block 110_a and the second electrode block 110_b that are adjacent in the line of electrodes L(i), and is insulated from the second touch electrode strip TB2(j). For example, a third insulation gap R3 exists between the connecting pattern 120(ij) and the second touch electrode strip TB2(j), and the connecting pattern 120(ij) and the second touch electrode strip TB2(j) are insulated from each other through the third insulation gap R3.

In embodiments of the present disclosure, the term "pattern layer" may be of a layer structure that includes specific patterns and is formed by performing a patterning process on at least one film layer, which is formed by using a same film forming process. Depending on different specific patterns, the patterning process may include several gluing, exposure, development or etching processes, and the specific patterns in the formed layer structure may be continuous or discontinuous, and these specific patterns may also be at different heights (or have different thicknesses).

The first conductive pattern layer 100 is a pattern layer with conductive properties. Materials of patterns (e.g., the electrode block 110, the connecting pattern 120 and the second touch electrode strip TB2) of the pattern layer may be the same.

For example, a material of the first conductive pattern layer 100 is a transparent conductive material (for example, the material may be selected from at least one of indium tin oxide (ITO), aluminum-doped zinc oxide (AZO), etc.), which can both conduct electricity and have a relatively high light transmittance in a range of visible light.

With reference to FIGS. 2 to 4B, the second conductive pattern layer 300 and the first conductive pattern layer 100 are stacked. That is, the second conductive pattern layer 300 and the first conductive pattern layer 100 are distributed in a thickness direction of the touch layer TL. For example, the second conductive pattern layer 300 may be stacked over the first conductive pattern layer 100. In a method for manufacturing the touch layer, the first conductive pattern layer 100 is formed before the second conductive pattern layer 300 is formed. As another example, the second conductive pattern layer 300 may be stacked under the first conductive pattern layer 100. The second conductive pattern layer 300 is formed before the first conductive pattern layer 100.

The second conductive pattern layer 300 includes at least one bridge group 310 corresponding to the line of electrodes L(i). The plurality of (e.g., all) electrode blocks 110 in the line of electrodes L(i) and at least one connecting pattern 120(ij) corresponding to the line of electrodes L(i) are electrically connected by the at least one bridge group 310 corresponding to the line of electrodes L(i), so as to form the first touch electrode strip TB1(i) (as shown in FIG. 1B). One bridge group 310 is connected to one connecting pattern 120(ij). In this case, the number of bridge groups 310 corresponding to the line of electrodes L(i) and the number of connecting patterns 120(ij) corresponding to the line of electrodes L(i) may be the same. For convenience of description below, a bridge group 310 connected to the connecting pattern 120(ij) is denoted as 310(ij). Two adjacent electrode blocks (the first electrode block 110_a and the second electrode block 110_b) in the line of electrodes L(i) are electrically connected to the connecting pattern 120(ij) by the bridge group 310(ij), thereby achieving the electrical connection between the two adjacent electrode blocks.

The bridge group 310(ij) includes a plurality of connecting bridges 311. In the two adjacent electrode blocks 110 (the first electrode block 110_a and the second electrode block 110_b) included in the line of electrodes L(i), an (e.g., each) electrode block 110 is electrically connected to the connecting pattern 120(ij) through at least one connecting bridge 311 (e.g., one or multiple connecting bridges 311) in the bridge group 310(ij). For convenience of description below, the connecting bridges 311 in the bridge group 310(*ij*) are classified into two types, in which one type is referred to as a first connecting bridge 311_*a*, and the other type is referred to as a second connecting bridge 311_*b*. The first connecting bridge 311_*a* is connected to the connecting pattern 120(*ij*) and the first electrode block 110_*a*, and the second connecting bridge 311_*b* is connected to the connecting pattern 120(*ij*) and the second electrode block 110_*b*. For example, the first electrode block 110_*a* is electrically connected to the connecting pattern 120(*ij*) through at least one first connecting bridge 311_*a*, and the second electrode block 110_*b* is electrically connected to the connecting pattern 120(*ij*) through at least one second connecting bridge 311_*b*.

The second conductive pattern layer 300 is a pattern layer with conductive properties. Material of patterns (e.g., all connecting bridges 311) in the pattern layer may be the same. For example, for a material of the second conductive pattern layer 300, reference may be made to the description of the first conductive pattern layer 100 above. For example, the second conductive pattern layer 300 and the first conductive pattern layer 100 may be made of the same or different materials.

With continued reference to FIGS. 2 to 4B, the insulation layer 200 extends between the first conductive pattern layer 100 and the second conductive pattern layer 300. For example, orthographic projections, on the insulation layer 200, of the electrode blocks 110, the connecting pattern(s) 120 and the second touch electrode strip TB2 of the first conductive pattern layer 100 are within an outline (i.e., edges) of the insulation layer 200; an orthographic projection, on the insulation layer 200, of the bridge group(s) 310 of the second conductive pattern layer 300 is within the outline of the insulation layer 200. As another example, if all first openings 210 and second openings 220 in the insulation layer 200 are omitted, an orthographic projection of the insulation layer 200 on the display panel DP (shown in FIG. 1B) covers the display area AA (shown in FIG. 1B). Edges of the orthographic projection of the insulation layer 200 on the display panel DP (shown in FIG. 1B) may be located outside the display area AA and surround the display area AA (shown in FIG. 1B), and may also at least partially overlap with a border of the display area AA. For convenience of description below, the insulation layer 200 in this form is referred to as a whole-layer insulation layer.

A material of the insulation layer 200 may be an inorganic insulating material such as silicon oxide, aluminum oxide, or a silicon nitride compound (SiNx). Of course, the material of the insulation layer 200 may also be an organic insulating material.

The insulation layer 200 is provided therein with a plurality of first openings 210 and a plurality of second openings 220. The first opening 210 is used for enabling the connecting bridge 311 to be electrically connected to the electrode block 110, and the second opening 220 is used for enabling the connecting bridge 311 to be electrically connected to the connecting pattern 120.

For example, a (e.g., each) connecting bridge 311 in at least one (e.g., all) of connecting bridges 311 electrically connecting the electrode block 110 to the connecting pattern 120 is electrically connected to the electrode block 110 through at least one first opening 210 (e.g., one or multiple first openings 210) in the insulation layer 200, and is electrically connected to the connecting pattern 120 through at least one second opening 220 (e.g., one or multiple second openings 220) in the insulation layer 200. For example, the first connecting bridge 311_*a* may be electrically connected to the first electrode block 110_*a* through at least one first opening 210, and may be electrically connected to the connecting pattern 120(*ij*) through at least one second opening 220. As another example, the second connecting bridge 311_*b* may be electrically connected to the second electrode block 110_*b* through at least one first opening 210, and may be electrically connected to the connecting pattern 120(*ij*) through at least one second opening 220. In some embodiments, referring to FIG. 3, all first connecting bridges 311_*a* and all second connecting bridges 311_*b* in the bridge group 310(*ij*) are staggered distributed in the second direction X. That is, each second connecting bridges 311_*b* has no portion being directly opposite to any one of the first connecting bridges 311_*a* in the first direction Y; or each first connecting bridges 311_*a* has no portion being directly opposite to any one of the second connecting bridges 311_*b* in the first direction Y. In this way, the connecting bridges in the bridge group 310(*ij*) are distributed relatively dispersedly, which can reduce the visibility of the bridge group 310(*ij*).

For example, the connecting pattern 120(*ij*) is a symmetric pattern having an axis of symmetry SY parallel to the first direction Y. All first connecting bridges 311_*a* and all second connecting bridges 311_*b* in the bridge group 310(*ij*) are distributed on two sides of the axis of symmetry SY, respectively. Thus, the connecting bridges in the bridge group 310(*ij*) are distributed more dispersedly, which further reduces the visibility of the bridge group 310(*ij*).

In a possible implementation, with continued reference to FIG. 3, the bridge group 310(*ij*) includes one first connecting bridge 311_*a* and one second connecting bridge 311_*b*. The two connecting bridges (the first connecting bridge 311_*a* and the second connecting bridge 311_*b*) are staggered distributed in the second direction X. As an example, the first connecting bridge 311_*a* and the second connecting bridge 311_*b* are distributed on two sides of the axis of symmetry SY, respectively.

Figure 5A:
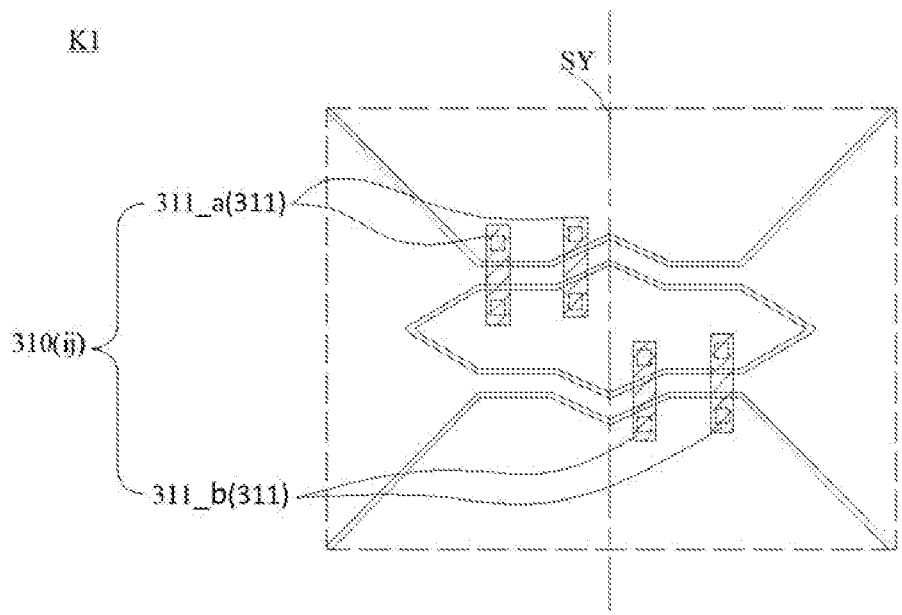
FIG. 5A is an alternative enlarged view of the region K1 in FIG. 2.

In another possible implementation, FIG. 5A is an alternative enlarged view of the region K1 in FIG. 2. Referring to FIG. 5A, the number of at least one of first connecting bridges 311_*a* and second connecting bridges 311_*b* in the bridge group 310(*ij*) is multiple. For example, the bridge group 310(*ij*) includes multiple first connecting bridges 311_*a* and multiple second connecting bridges 311_*b*. All first connecting bridges 311_*a* are distributed on a side of the axis of symmetry SY, and all second connecting bridges 311_*b* are distributed on another side of the axis of symmetry SY.

Figure 5B:
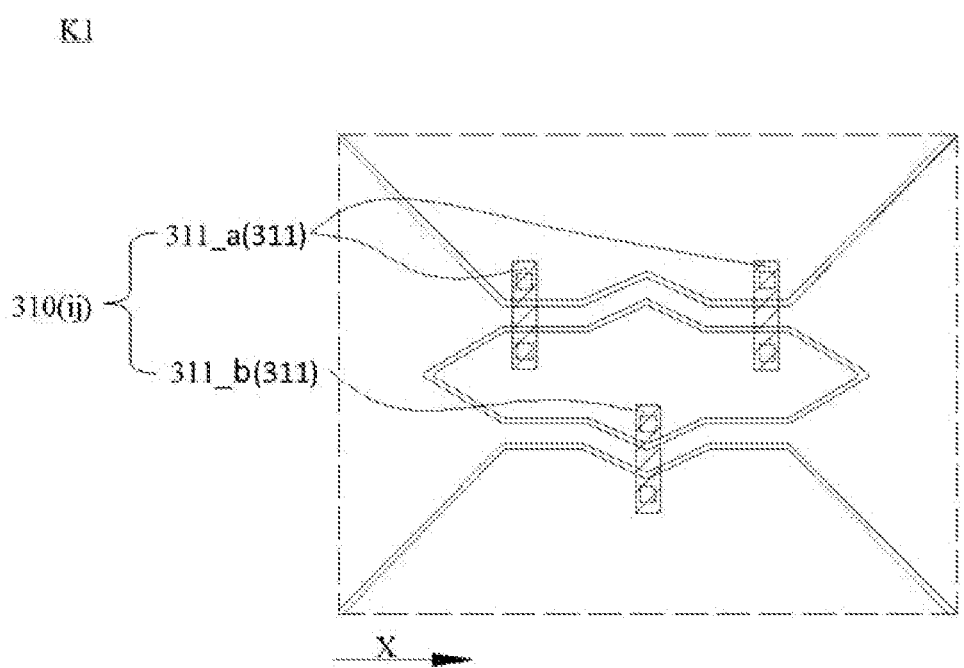
FIG. 5B is another alternative enlarged view of the region K1 in FIG. 2.

As another example, FIG. 5B is another alternative enlarged view of the region K1 in FIG. 2. Referring to FIG. 5B, the number of at least one of first connecting bridges 311_*a* and second connecting bridges 311_*b* in the bridge group 310(*ij*) is multiple. In the bridge group 310(*ij*), the number of first connecting bridges 311_*a* is denoted by Ta, and the number of second connecting bridges 311_*b* is denoted by Tb. Ta is greater than or equal to 2 (i.e., Ta≥2), and Tb is greater than or equal to 1 (i.e., Tb≥1). Alternatively, Ta is greater than or equal to 1 (i.e., Ta≥1), and Tb is greater than or equal to 2 (i.e., Tb≥2). As an example, a difference between Ta and Tb is 1. For example, in the bridge group 310(*ij*), Ta first connecting bridges 311_*a* and Tb second connecting bridges 311_*b* are arranged at intervals in the second direction X.

Figure 6A:
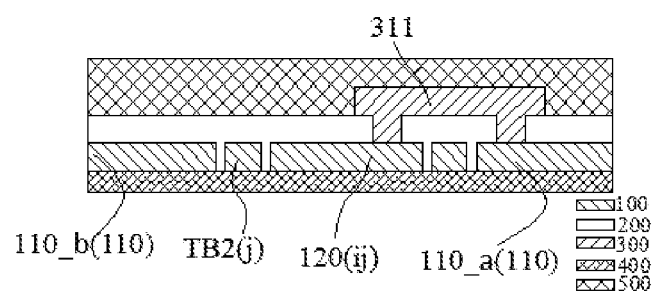
FIG. 6A is another sectional view taken along the line A1-A2 in FIG. 3.
Figure 6B:
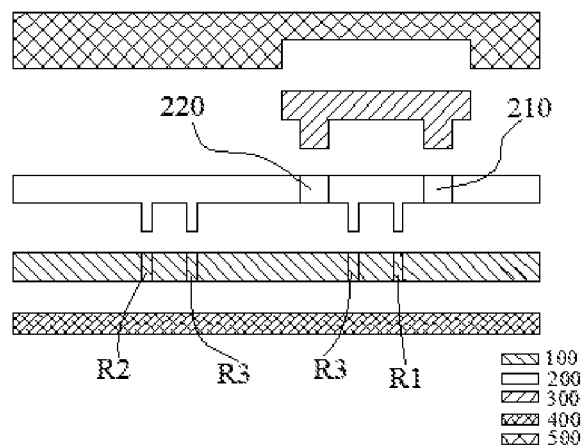
FIG. 6B is an exploded view of FIG. 6A.

FIG. 6A is another sectional view taken along A1-A2 in FIG. 3; FIG. 6B is an exploded view of FIG. 6A. Referring to FIGS. 6A and 6B, the touch layer TL may further include a base 400, and the base 400 is stacked under the first conductive pattern layer 100 (i.e., on a side of the first conductive pattern layer 100 away from the second conductive pattern layer 300). The base 400 may be a rigid base or a flexible base. The rigid base may include, for example, at least one of a glass base, a polymethyl methacrylate (PMMA) base, a quartz base and a metal base. The flexible base may include, for example, at least one of a polyethylene terephthalate (PET) base, a polyethylene naphthalate two formic acid glycol ester (PEN) base and a polyimide (PI) base.

With continued reference to FIGS. 6A and 6B, the touch layer TL may further include a protective layer 500, and the protective layer 500 is stacked on the second conductive pattern layer 300 (i.e., on a side of the second conductive pattern layer 300 away from the first conductive pattern layer 100). For a material of the protective layer 500, reference may be made to the description of the insulation layer 200 above. For example, the protective layer 500 and the insulation layer 200 may be made of the same or different materials.

Figure 7A:
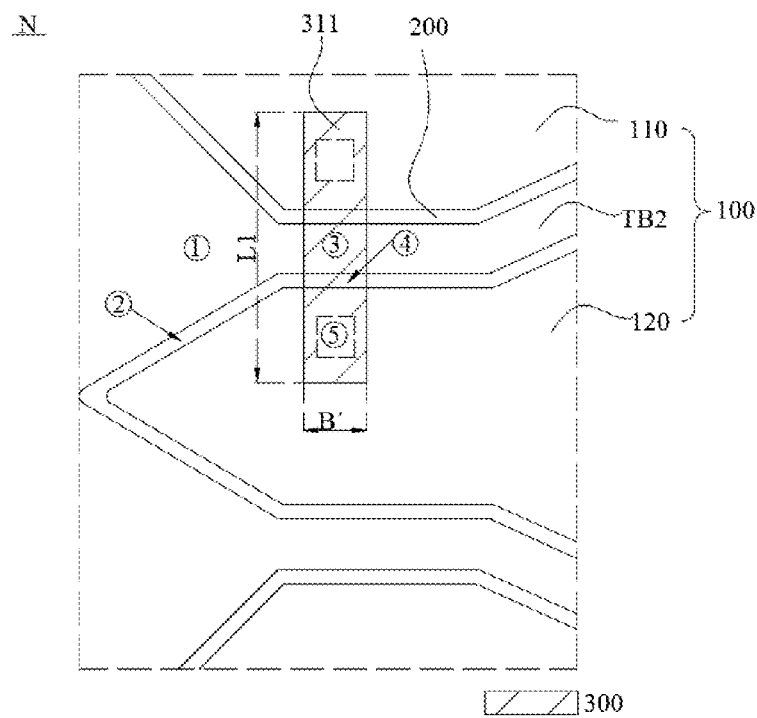
FIG. 7A is an enlarged view of the region N in FIG. 3.

Two adjacent electrode blocks 110 are electrically connected to the connecting pattern 120 through connecting bridges 311 in the embodiments, so that dimensions of the connecting bridge 311 may be reduced. FIG. 7A is an enlarged view of the region N in FIG. 3. Referring to FIG. 7A, a width of the connecting bridge 311 is denoted as B', and a dimension of the connecting bridge 311 in a direction perpendicular to a width direction is denoted as L1. Since the connecting bridge 311 only needs to extend from one electrode block 110 to the connecting pattern 120, and does not need to extend to another electrode block 110, L1 may be relatively small. The dimension of the connecting bridge gets small, which can reduce the ability of detecting the connecting bridge by human eyes, thereby reducing the visibility of the connecting bridge. Moreover, the width B' of the connecting bridge 311 may be appropriately reduced on a premise of ensuring the manufacturing process, thereby further reducing the visibility of the connecting bridge.

In addition, referring to FIG. 6B, the whole-layer insulation layer 200 is used to insulate the first conductive pattern layer from the second conductive pattern layer in the embodiments.

Figure 7B:
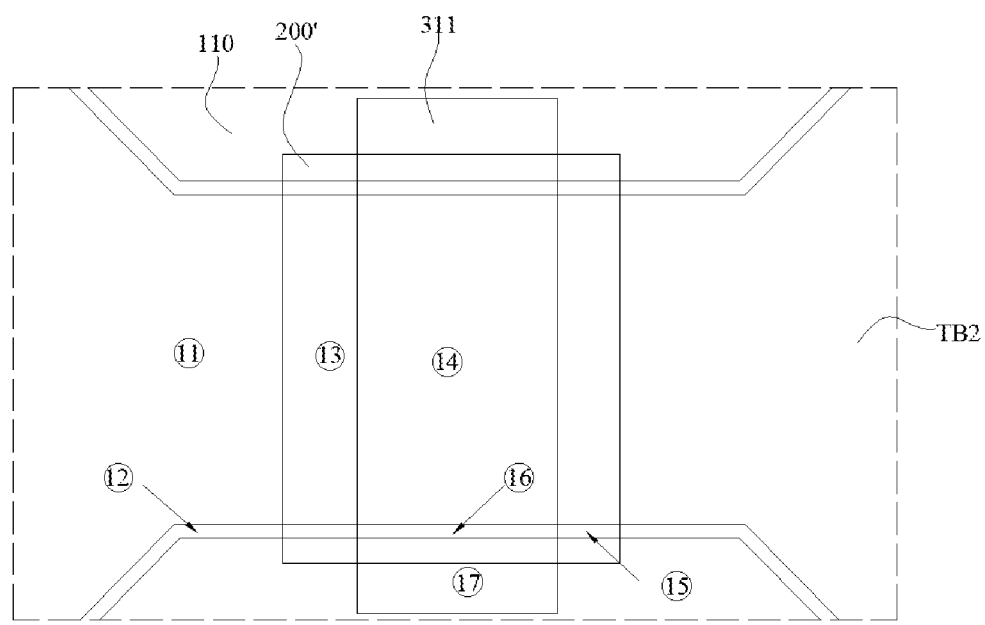
FIG. 7B is a partial schematic diagram of a touch layer provided in some comparative embodiments.

FIG. 7B is a partial schematic diagram of a touch layer provided in some comparative embodiments. In FIG. 7B, two adjacent electrode blocks 110 are electrically connected by a connecting bridge 311; the connecting bridge 311 and the second touch electrode strip TB2 are insulated by an insulation pattern 200', and the insulation pattern 200' is only disposed at a position where the connecting bridge 311 is located.

Based on the touch layers shown in FIGS. 7A and 7B, stacked layers in each of the touch layers near the connecting bridge 311 are specifically analyzed below.

A film layer structure at the position ① in FIG. 7A includes a portion of the insulation layer 200 and a portion of a second touch electrode strip TB2.

A film layer structure at the position ② in FIG. 7A includes a portion of the insulation layer 200.

A film layer structure at the position ③ in FIG. 7A includes: a portion of the insulation layer 200, a portion of the second touch electrode strip TB2, and a portion of a connecting bridge 311.

A film layer structure at the position ④ in FIG. 7A includes: a portion of the insulation layer 200 and a portion of the connecting bridge 311.

A film layer structure at the position ⑤ in FIG. 7A includes: a portion of the connecting bridge 311 and an electrode block 110.

A film layer structure at the position ⑪ in FIG. 7B includes: a portion of a second touch electrode strip TB2.

A film layer structure at the position ⑫ in FIG. 7B is: none.

A film layer structure at the position ⑬ in FIG. 7B includes: a portion of an insulation pattern 200' and a portion of the second touch electrode strip TB2.

A film layer structure at the position ⑭ in FIG. 7B includes: a portion of the insulation pattern 200', a portion of the second touch electrode strip TB2, and a portion of a connecting bridge 311.

A film layer structure at the position ⑮ in FIG. 7B includes: a portion of the insulation pattern 200'.

A film layer structure at the position ⑯ in FIG. 7B includes: a portion of the insulation pattern 200' and a portion of the connecting bridge 311.

A film layer structure at the position ⑰ in FIG. 7B includes: an electrode block 110 and a portion of the connecting bridge 311.

Thus, it can be seen that, there are five positions, in which different stacked layers exist, near the connecting bridge 311 in FIG. 7A, while there are seven positions, in which different stacked layers exist, in the comparative embodiments shown in FIG. 7B. Obviously, the complexity of film layer structures near the connecting bridge 311 is reduced in the embodiments. The film layer structures have different compositions, resulting in different corresponding reflectivities. Therefore, the number of positions having different reflectivities near the connecting bridge 311 is reduced in the embodiments, which is advantageous for reducing the visibility of the connecting bridge 311.

In addition, the reflectivity of the material of the insulation layer 200 may be higher than the reflectivity of materials of the first conductive pattern layer 100 (including the electrode blocks 110, the second touch electrode strip TB2, and the connecting pattern(s) 120) and the second conductive pattern layer 300 (including the connecting bridges 311), and the insulation layer 200 exists in four positions other than the position ⑤ in the five positions in the embodiments. Therefore, a difference of reflectivity between the four positions is relatively small. Moreover, an area of an opening at the position ⑤ is generally small, and an influence of the opening on the visibility of the connecting bridge 311 may be negligible. However, for stacked layer structures at the seven positions in the comparative embodiments shown in FIG. 7B, the insulation pattern 200' exists in four positions of the seven positions, and no insulation pattern 200' exists in three positions of the seven positions. Obviously, there is a large difference of reflectivity between the seven positions, resulting in significant visibility of connecting bridge 311. In summary, the visibility of the connecting bridge 311 is further reduced in the embodiments.

Besides, the whole-layer insulation layer 200 (that is, the insulation layer covers the connecting bridges 311, the electrode blocks 110, the connecting pattern(s) 120, and the second touch electrode strip TB2) is used in the embodiments to protect the first conductive pattern layer and the second conductive pattern layer. However, in FIG. 7B, protection is performed by the insulation pattern 200' provided only at the position where the connecting bridge 311 is located, and other positions are exposed. Thus, it can be seen that, the whole-layer insulation layer 200 in the embodiments can improve an electrostatic discharge (ESD) performance.

In addition, under the same manufacturing process conditions and test conditions, a product including the touch layer in the embodiments (the embodiments shown in FIG. 7A) and a product including the touch layer in the comparative embodiments (the embodiments shown in FIG. 7B) are each subjected to ESD resistance performance tests in a contact discharge test manner and an air discharge test manner.

The contact discharge test manner is a test manner in which an electrode of a generator is kept in contact with an equipment under test and discharge is excited by a discharge switch in the generator. Discharge voltages that equipments under test in the embodiments and the comparative embodiments can bear can be tested in the contact discharge test manner, and the larger the discharge voltage value that can be borne, the higher the ESD resistance. The air discharge test manner is a manner in which a charging electrode of a generator gets close to the equipment under test and the equipment under test is excited to discharge by sparks. The discharge voltages that the equipments under test in the embodiments and the comparative embodiments can bear can be tested in the air discharge test manner, and the larger the discharge voltage value that can be borne, the higher the ESD resistance. The test results are as follows:

| Discharge voltage that the equipment under test (a product including the touch layer) can bear | |
| --- | --- |
| Contact discharge test manner | Air discharge test manner |
| The embodiments 18 KV | 20 KV |
| Comparative embodiments 10 KV | 18 KV |

Thus, it can be seen that, for the whole-layer insulation layer in the embodiments, a larger discharge voltage can be borne. As a result, the ESD resistance performance is improved.

Figure 8A:
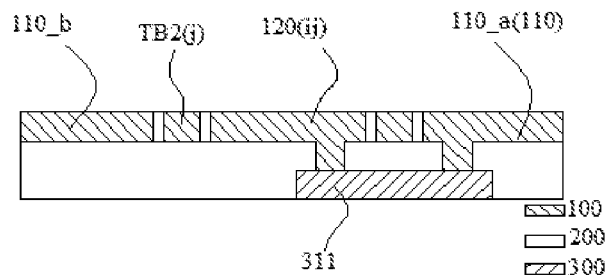
FIG. 8A is yet another sectional view taken along the line A1-A2 in FIG. 3.
Figure 8B:
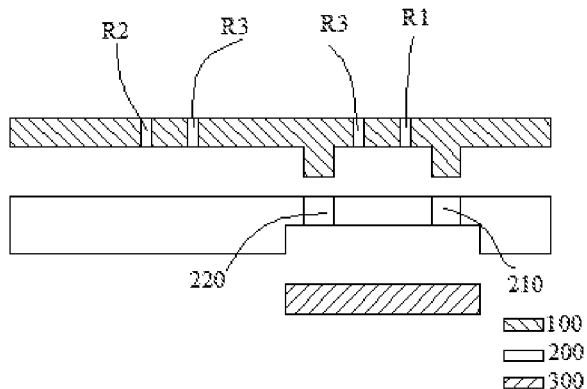
FIG. 8B is an exploded view of FIG. 8A.

FIG. 8A is yet another sectional view taken along line A1-A2 in FIG. 3; FIG. 8B is an exploded view of FIG. 8A. Referring to FIGS. 8A and 8B, some embodiments of the present disclosure provide the touch layer TL, of which the second conductive pattern layer 300, the insulation layer 200, and the first conductive pattern layer 100 are sequentially arranged from bottom to top. For example, in the method for manufacturing the touch layer TL, the second conductive pattern layer 300, the insulation layer 200, and the first conductive pattern layer 100 may be formed in sequence. For other structures, reference may be made to the description in the embodiments above. Effects achieved in the embodiments are the same as the effects achieved in the embodiments above, and will not be repeated here.

Figure 9A:
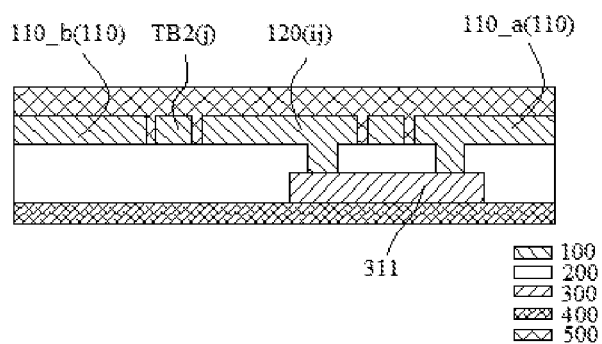
FIG. 9A is yet another sectional view taken along the line A1-A2 in FIG. 3.
Figure 9B:
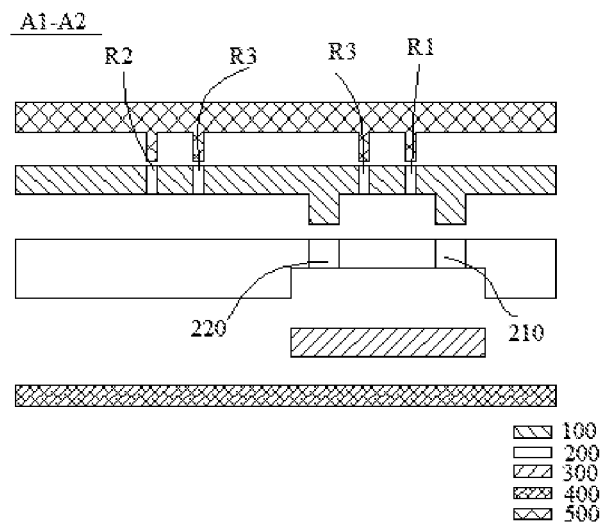
FIG. 9B is an exploded view of FIG. 9A.

FIG. 9A is yet another sectional view taken along line A1-A2 in FIG. 3; FIG. 9B is an exploded view of FIG. 9A. Referring to FIGS. 9A and 9B, some embodiments of the disclosure provide the touch layer TL. On the basis of FIG. 8A, the touch layer TL may be further provided with the protective layer 500, the base 400, or the protective layer 500 and the base 400. For example, in the method for manufacturing the touch layer TL, the second conductive pattern layer 300, the insulation layer 200, the first conductive pattern layer 100, and the protective layer 500 may be formed in sequence on the substrate 400. For other structures, reference may be made to the description in the embodiments above. Effects achieved in the embodiments are the same as the effects achieved in the embodiments above, and will not be repeated here.

Figure 10:
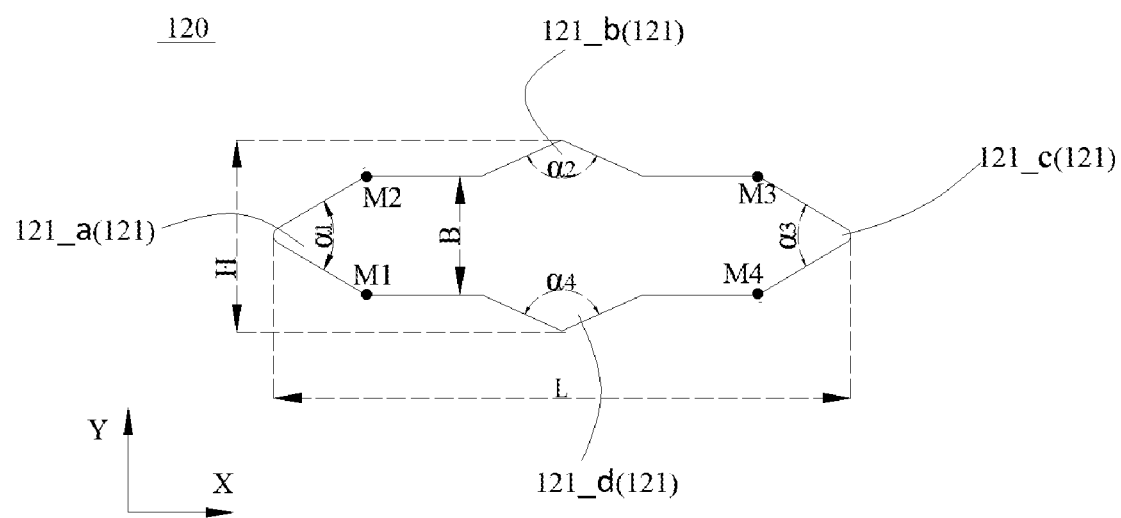
FIG. 10 is a schematic diagram of a connecting pattern in FIG. 3.

FIG. 10 is a schematic diagram of the connecting pattern in FIG. 3. Referring to FIG. 10, some embodiments of the present disclosure provide the touch layer TL. A dimension L of the connecting pattern 120 in the second direction X is greater than a dimension H of the connecting pattern 120 in the first direction Y, so that the connecting pattern 120 is in a shape of a long stripe. As a result, it reduces the ability of detecting the connecting pattern 120 by human eyes, thereby reducing the visibility of the connecting pattern 120.

An outline is formed by connecting adjacent points with four edges, and four points on the outline of the connecting pattern 120 are denoted as M1, M2, M3, and M4. The connecting pattern 120 includes a first edge L(M1-M2), a second edge L(M2-M3), a third edge L(M3-M4), and a fourth edge L(M4-M1) that are sequentially connected end to end. A mark of each edge is distinguished by marks of two ends of the edge. The first edge L(M1-M2) and the third edge L(M3-M4) are opposite in the second direction X, and the second edge L(M2-M3) and the fourth edge L(M4-M1) are opposite in the first direction Y. At least one (e.g., one or more) of the first edge L(M1-M2), the second edge L(M2-M3), the third edge L(M3-M4), and the fourth edge L(M4-M1) is in a shape of a polyline, and each edge in the shape of the polyline is called a polyline-shaped edge.

For example, in the four edges, one edge is the polyline-shaped edge, and other three edges are line-shaped edges or curve-shaped edges. As another example, in the four edges, two opposite edges (e.g., the second edge L(M2-M3) and the fourth edge L(M4-M1)) are polyline-shaped edges, and other two edges are line-shaped edges or curve-shaped edges. As another example, all of the four edges are polyline-shaped edges in FIG. 10.

The connecting pattern 120 in the embodiments has the polyline-shaped edge, so that a propagation direction of reflected light irradiated onto the polyline-shaped edge is changed. In this way, compared with reflected light irradiated onto a line-shaped edge, the energy of the reflected light irradiated onto the polyline-shaped edge is dispersed into visual directions, and the light intensity of the reflected light in one visual direction becomes weak, so that the ability of detecting the connecting pattern 120 by human eyes is reduced. As a result, the visibility of the connecting pattern can be reduced.

In a possible implementation, with continued reference to FIG. 10, the connecting pattern 120 has at least one convex tooth 121 (e.g., one or multiple convex teeth 121) in the polyline-shaped edge. As an example, each polyline-shaped edge in partial polyline-shaped edges included in the connecting pattern 120 is provided with at least one convex tooth 121 therein. As another example, each polyline-shaped edge in all polyline-shaped edges included in the connecting pattern 120 is provided with at least one convex tooth 121 therein. For example, in FIG. 10, the four edges included in the connecting pattern 120 are all polyline-shaped edges, and each polyline-shaped edge is provided with one convex tooth therein.

For example, the first edge L(M1-M2) is the polyline-shaped edge, the connecting pattern 120 has at least one first convex tooth 121_a in the first edge L(M1-M2), and a vertex angle α1 of the first convex tooth 121_a is an acute angle. The first convex tooth 121_a is the convex tooth 121. For example, the vertex angle α1 of the first convex tooth 121_a is in a range of 30° to 90°, inclusive. The vertex angle α1 of the first convex tooth may be 30°, 40°, 50°, 60°, 70°, 80°, or 90°.

As another example, the second edge L(M2-M3) is the polyline-shaped edge, the second edge L(M2-M3) of the connecting pattern 120 has at least one second convex tooth 121_b, and a vertex angle α2 of the second convex tooth 121_b is an obtuse angle. The second convex tooth 121_b is the convex tooth 121. For example, the vertex angle α2 of the second convex tooth 121_b is in a range of 120° to 145°, inclusive. The vertex angle α2 of the second convex tooth 121_b may be 120°, 125°, 130°, 135°, 140°, or 145°.

As another example, the third edge L(M3-M4) is the polyline-shaped edge, the third edge L(M3-M4) of the connecting pattern 120 has at least one third convex tooth 121_c, and a vertex angle α3 of the third convex tooth 121_c is an acute angle. The third convex tooth 121_c is the convex tooth 121. For example, the vertex angle α3 of the third convex tooth 121_c is in a range of 30° to 90°, inclusive. The vertex angle α3 of the third convex tooth 121_c may be 30°, 40°, 50°, 60°, 70°, 80°, or 90°. In addition, the vertex angle α3 of the third convex tooth 121_c and the vertex angle α1 of the first convex tooth may be the same or different.

As another example, the fourth edge L(M4-M1) is the polyline-shaped edge, the fourth edge L(M4-M1) of the connecting pattern 120 has at least one fourth convex tooth 121_d, and a vertex angle α4 of the fourth convex tooth 121_d is an obtuse angle. The fourth convex tooth 121_d is the convex tooth 121. For example, the vertex angle α4 of the fourth convex tooth 121_d is in a range of 120° to 145°, inclusive. The vertex angle α4 of the fourth convex tooth 121_d may be 120°, 125°, 130°, 135°, 140°, or 145°. The vertex angle α4 of the fourth convex tooth 121_d and the vertex angle α2 of the second tooth 121_b may be the same or different.

A distance of a line between M1 and M2 (for example, the line is substantially parallel to the first direction Y) in FIG. 10 is denoted as B, and the distance B of the line is referred to as the width of the connecting pattern 120. For example, the width B of the connecting pattern 120 is in a range of 150 μm to 250 μm, inclusive. For example, the width B of the connecting pattern 120 may be 150 μm, 170 μm, 190 μm, 210 μm, 230 μm, or 250 μm. Since the second edge L(M2-M3) and the fourth edge L(M4-M1) are each provided with the convex tooth 121 therein, a minimum distance between the two edges is still the distance B. However, in a case where convex teeth 121 in the second edge L(M2-M3) and the fourth edge L(M4-M1) are all replaced with concave teeth, the minimum distance between the two edges is necessarily gets smaller, resulting in a possibility that the connecting pattern 120 breaks. The scheme in the embodiments can reduce the risk of breaking of the connecting pattern 120. Similarly, the first edge L(M1-M2) and the third edge L(M3-M4) are each provided with the convex tooth 121 therein, which has similar effects.

Figure 11:
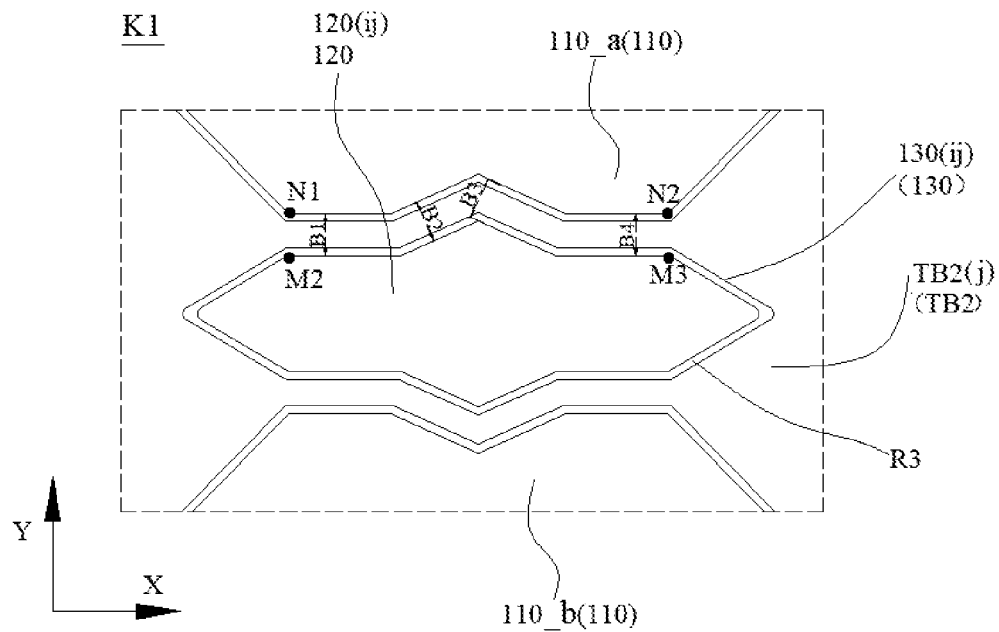
FIG. 11 is yet another alternative enlarged view of the region K1 in FIG. 2.

FIG. 11 is yet another alternative enlarged view of the region K1 in FIG. 2.

In some embodiments, referring to FIG. 11, the electrode block 110 includes a fifth edge L(N1-N2), N1 and N2 representing two end points of the fifth edge L(N1-N2). The fifth edge L(N1-N2) and the second edge L(M2-M3) of the connecting pattern 120 are opposite in the first direction Y and adjacent in position. An extending direction of the fifth edge L(N1-N2) is substantially parallel to an extending direction of the second edge L(M2-M3). For example, extending directions of the two edges are substantially parallel to the second direction X. A width of a gap between the fifth edge L(N1-N2) and the second edge L(M2-M3) is substantially uniform. For example, distances (B1, B2, B3 and B4) between all corresponding line segments included in the two edges (the fifth edge L(N1-N2) and the second edge L(M2-M3)) in FIG. 10 may be substantially equal. As another example, the distances (B1, B2, B3 and B4) are each substantially equal to 50 μm. In this way, when the product is designed, as long as the size of one position meets a set size. As a result, the complexity of product design can be reduced.

In some embodiments, with continued reference to FIG. 11, at least one third opening 130 (e.g., one or multiple third openings 130) are provided in the second touch electrode strip TB2. A (e.g., each) connecting pattern 120 is located in a third opening 130. For example, a third opening 130 may be disposed between every two adjacent electrode blocks 110 in the line of electrodes L(i) (as shown in FIG. 2). For convenience of description below, a third opening 130 located at the crossing position between the line of electrodes L(i) and the second touch electrode strip TB2(j) (as shown in FIG. 2) is referred to as a third opening 130(ij). The third opening 130(ij) is located between two adjacent electrode blocks (the first electrode block 110_a and the second electrode block 110_b) in the line of electrodes L(i). The connecting pattern 120(ij) is located in the third opening 130(ij). In this way, two conductive paths can be formed in the second touch electrode strip TB2(j) on upper and lower sides of the third opening 130(ij) in FIG. 11, which is beneficial to preventing the second touch electrode strip TB2(j) from being disconnected at the third opening 130(ij).

For example, a width of the gap R3 between the third opening 130 and the connecting pattern 120 is substantially uniform (that is, the width is substantially equal everywhere).

Figure 12:
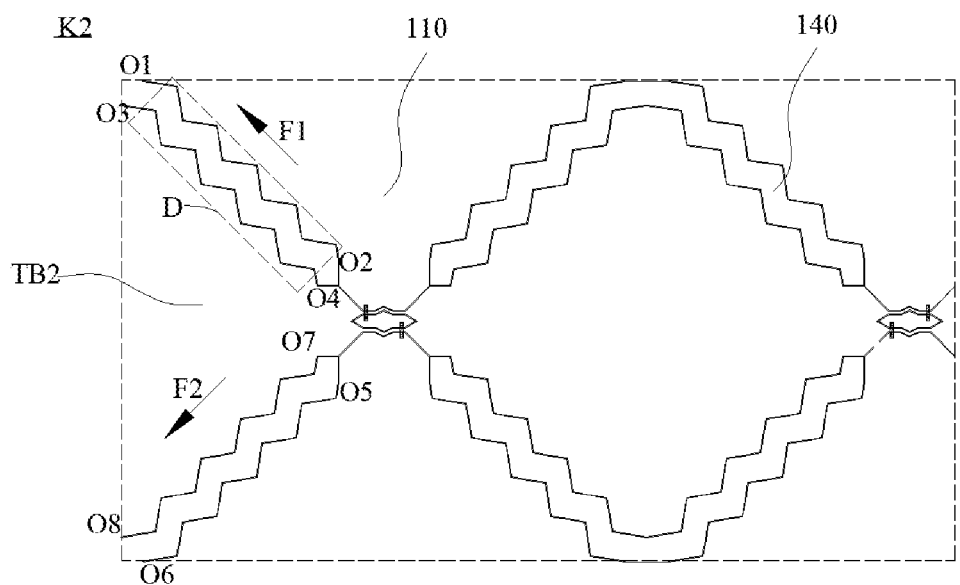
FIG. 12 is an enlarged view of the region K2 in FIG. 2.
Figure 13:
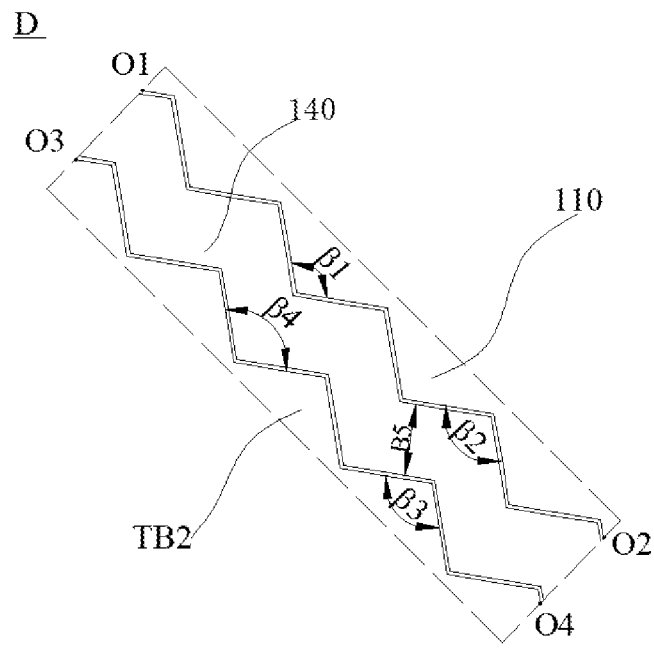
FIG. 13 is an enlarged view of the region D in FIG. 12.

FIG. 12 is an enlarged view of the region K2 in FIG. 2; FIG. 13 is an enlarged view of the region D in FIG. 12. Referring to FIGS. 12 and 13, some embodiments of the present disclosure provide the touch layer TL. The electrode block 110 of the touch layer TL further includes a sixth edge L(O1-O2) extending along a third direction F1, O1 and O2 representing two end points of the sixth edge L(O1-O2). The second touch electrode strip TB2 further includes a seventh edge L(O3-O4) extending along the third direction F1, O3 and 4 representing two end points of the seventh edge L(O3-O4). The sixth edge L(O1-O2) and the seventh edge L(O3-O4) are adjacent in position. That is, the sixth edge L(O1-O2) and the seventh edge L(O3-O4) are opposite in a direction perpendicular to the third direction F1. In addition, neither the electrode block 110 nor the second touch electrode strip TB2 extends to a region between the sixth edge L(O1-O2) and the seventh edge L(O3-O4).

At least one (e.g., one or both) of the sixth edge L(O1-O2) and the seventh edge L(O3-O4) is in the shape of the polyline. For example, the sixth edge L(O1-O2) and the seventh edge L(O3-O4) are each in the shape of the polyline. The sixth edge L(O1-O2) and the seventh edge L(O3-O4) are each in the shape of the polyline, which can reduce the visibility of the sixth edge L(O1-O2) and the seventh edge L(O3-O4), so that the visibility of the electrode block 110 and the second touch electrode strip TB2 can be reduced.

For example, the third direction F1 intersects the first direction Y above. For example, an included angle between the two directions is an acute angle. For example, the third direction F1 also intersects the second direction X above. For example, an included angle between the two directions is an acute angle.

For example, a bending angle, at a bending position, of the polyline-shaped edge(s) in the sixth edge L(O1-O2) and the seventh edge L(O3-O4) is an obtuse angle. The bending angle is in a range of 120° to 145°, inclusive. For example, the bending angle may be 120°, 125°, 130°, 135°, 140°, or 145°.

For example, FIG. 13 is an enlarged view of the region D in FIG. 12. Referring to FIG. 13, the sixth edge L(O1-O2) is in the shape of the polyline. The bending angle, at a (e.g., each) bending position, of the sixth edge L(O1-O2) is in the range of 120° to 145°, inclusive. As another example, the bending angle may be 120°, 125°, 130°, 135°, 140°, or 145°.

For example, at bending portions of the sixth edge L(O1-O2), a first convex angle β1 (i.e., a bending angle) and a first concave angle β2 (i.e., another bending angle) are formed in an alternating manner. The first convex angle β1 and the first concave angle β2 may be the same or different.

As another example, the seventh edge L(O3-O4) is in the shape of the polyline. The bending angle, at a bending position, of the polyline-shaped seventh edge L(O3-O4) is in the range of 120° to 145°, inclusive. For example, the bending angle may be 120°, 125°, 130°, 135°, 140°, or 145°.

For example, at bending portions of the seventh edge L(O3-O4), a second convex angle β3 (i.e., a bending angle) and a second concave angle β4 (i.e., another bending angle) are formed in an alternating manner. The second convex angle β3 and the second concave angle β4 may be the same or different.

In addition, the first convex angle β1 of the sixth edge L(O1-O2) and the second concave angle β4 of the seventh edge L(O3-O4) are disposed opposite to each other in the direction perpendicular to the third direction F1, and the first convex angle β1 and the second concave angle β4 are substantially equal. Similarly, the first concave angle β2 of the sixth edge L(O1-O2) and the second convex angle β3 of the seventh edge L(O3-O4) are disposed opposite to each other in the direction perpendicular to the third direction F1, and the first concave angle β2 and the second convex angle β3 are substantially equal.

With continued reference to FIG. 13, in some possible implementations, at least a portion (e.g., the portion of all) of a gap between the sixth edge L(O1-O2) and the seventh edge L(O3-O4) has a substantially uniform width B5. For example, a distance between the sixth edge L(O1-O2) and the seventh edge L(O3-O4) is approximately equal everywhere.

For example, referring to FIG. 12, the electrode block 110 further includes an eighth edge L(O5-O6) extending along a fourth direction F2, O5 and O6 representing two end points of the eighth edge L(O5-O6). The second touch electrode strip TB2 further includes a ninth edge L(O7-O8) extending along the fourth direction F2, O7 and O8 representing two end points of the ninth edge L(O7-O8). The eighth edge L(O5-O6) and the ninth edge L(O7-O8) are opposite in a direction perpendicular to the fourth direction F2. At least one (e.g., one or both) of the eighth edge L(O5-O6) and the ninth edge L(O7-O8) is in the shape of the polyline.

A specific shape (for example, the specific shape includes a bending angle at a bending position) of each of the eighth edge L(O5-O6) and the ninth edge L(O7-O8) and effects that can be achieved by the eighth edge L(O5-O6) and the ninth edge L(O7-O8) are similar to those related to the sixth edge L(O1-O2) and the seventh edge L(O3-O4), and will not be repeated here.

With continued reference to FIG. 13, in order to avoid a short circuit between the electrode block 110 and the second touch electrode strip TB2, the two are separated by a certain distance, and the distance generally needs to be relatively large. In order to match the optical uniformity, some embodiments of the present disclosure provide the touch layer. The touch layer further includes dummy electrodes 140. The dummy electrode 140 is located between the electrode block 110 and the second touch electrode strip TB2. The dummy electrode 140 is insulated from the second touch electrode strip TB2 and the first touch electrode strip TB1.

Figure 14:
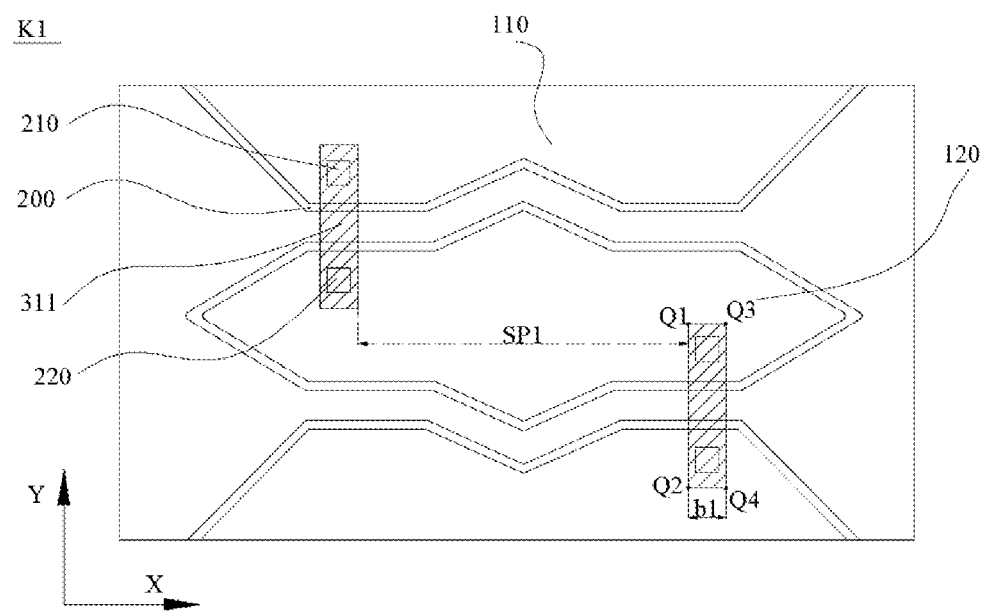
FIG. 14 is yet another alternative enlarged view of the region K1 in FIG. 2.

FIG. 14 is yet another alternative enlarged view of the region K1 in FIG. 2.

Referring to FIG. 14, some embodiments of the present disclosure provide the touch layer TL. For example, a projection, in the thickness direction of the touch layer TL, of the connecting bridge 311 on the insulation layer 200 (which is referred to as an orthographic projection of the connecting bridge 311 on the insulation layer 200 hereinafter) covers at least one first opening 210. For example, the connecting bridge 311 is connected to the electrode block 110 through multiple first openings 210. In this case, the orthographic projection of the connecting bridge 311 on the insulation layer 200 may cover some or all of the multiple first openings 210.

The orthographic projection of the connecting bridge 311 on the insulation layer 200 covers a first opening 210, which means that, if viewed along the thickness direction of the touch layer TL, edges of the connecting bridge 311 may be located outside the first opening 210 and surround the first opening 210 for a circle. Of course, the edges of the connecting bridge 311 and the first opening 210 may also be partially aligned. In this way, it can secure the reliability of the electrical connection between the connecting bridge 311 and the electrode block 110. For convenience of description below, such the first opening 210 is referred to as a small opening herein.

As another example, the orthographic projection of the connecting bridge 311 on the insulation layer 200 covers at least one second opening 220, so that the connecting bridge 311 is connected to the connecting pattern 120. For a specific implementation of this example, reference may be made to the above description about that the orthographic projection of the connecting bridge 311 on the insulation layer 200 covers at least one first opening 210, which will not be repeated here. For convenience of description below, such the second opening 220 is also referred to as a small opening herein.

As another example, the first opening 210 for connecting the connecting bridge 311 to the electrode block 110 and the second opening 220 for connecting the connecting bridge 311 to the connecting pattern 120 may both be small openings.

In some possible implementations, with continued reference to FIG. 14, the connecting bridge 311 is line-shaped. For example, the connecting bridge 311 has two long edges (an edge L(Q1-Q2) and an edge L(Q3-Q4)) that are opposite in the second direction X. Extending direction of the two long edges (the edge L(Q1-Q2) and the edge L(Q3-Q4)) may be substantially parallel to each other. For example, the extending direction may be substantially parallel to the first direction Y, or may intersect the first direction Y. Two edges (an edge L(Q1-Q3) and an edge L(Q2-Q4)) for connecting the two long edges (the edge L(Q1-Q2) and the edge L(Q3-Q4)) may be lines, or may be in other shapes such as curved lines or polylines. For example, a width b1 of the connecting bridge 311 may be substantially uniform. For example, a distance between the two long edges (the edge L(Q1-Q2) and the edge L(Q3-Q4)) of the connecting bridge 311 is approximately equal everywhere. In this case, the connecting bridge 311 is, for example, in a shape of a rectangle.

For example, a spacing SP1 between any two adjacent connecting bridges 311 in the bridge group (i.e., a minimum distance between the two adjacent connecting bridges 311) in the second direction X is greater than or equal to 100 μm. For example, the spacing SP1 may be 120 μm, 150 μm, 170 μm, or 200 μm. As a result, the ability of detecting the two connecting bridges by human eyes is reduced.

Figure 15:
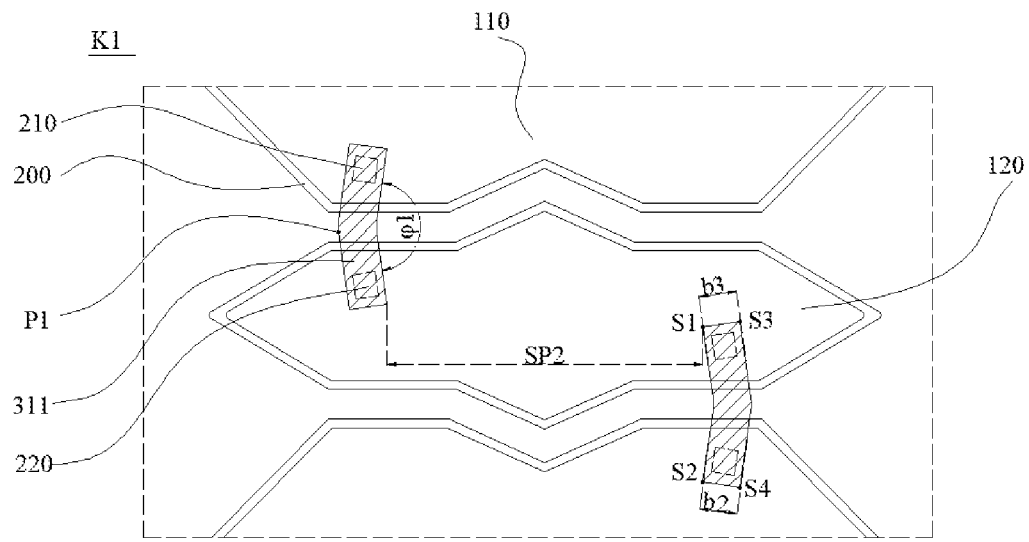
FIG. 15 is yet another alternative enlarged view of the region K1 in FIG. 2.

In some other possible implementations, FIG. 15 is yet another alternative enlarged view of the region K1 in FIG. 2. Referring to FIG. 15, the connecting bridge 311 may also be polyline-shaped. For example, the connecting bridge 311 may be formed by a plurality of straight line segments that are connected at at least one bending position P1. Every two adjacent straight line segments are not in a same straight line. For example, the connecting bridge 311 in FIG. 15 has one bending position P1, and the connecting bridge 311 includes two straight line segments that are located at two sides of the bending position P1, respectively. An orthographic projection of one straight line segment on the insulation layer 200 overlaps with the first opening 210, so as to be connected to the electrode block 110 at the first opening 210; an orthographic projection of another straight line segment on the insulation layer 200 covers the second opening 220, so as to be connected to the connecting pattern 120 at the second opening 220. For example, the first opening 210 or the second opening 220 is a small opening. As another example, the first opening 210 and the second opening 220 are small openings.

For example, the width of the connecting bridge 311 is substantially uniform. For example, the connecting bridge 311 has two long edges (an edge L(S1-S2) and an edge L(S3-S4)) that are opposite in the second direction X, S1 and S2 being two end points of a long edge, and S3 and S4 being two end points of another long edge. A distance between the two long edges (the edge L(S1-S2) and the edge L(S3-S4)) is substantially equal everywhere. That is, widths (a width b2 and a width b3) of the straight line segments (two straight line segments are shown in FIG. 15) of the connecting bridge 311 are substantially equal. Since the two long edges of the polyline-shaped connecting bridge 311 are each in the shape of the polyline, the visibility of the connecting bridge 311 can be reduced and the difficulty of shadow elimination of the connecting bridge 311 can be reduced based on reasons similar to those described above.

For example, the two long edges (the edge L(S1-S2) and the edge L(S3-S4) of the connecting bridge 311 may each have a circular arc for transition or a sharp corner at the bending position P1.

For example, a bending angle φ1 of the polyline-shaped connecting bridge 311 may be an obtuse angle, and the bending angle φ1 is in a range of 120° to 150°, inclusive. For example, the bending angle φ1 may be 120°, 130°, 140°, or 145°.

For example, for a value of a distance SP2 between any two adjacent connecting bridges 311 in the bridge group in the second direction X, reference may be made to the distance SP1 above. As a result, it further reduces the ability of detecting the two connecting bridges 311 by human eyes.

Figure 16:
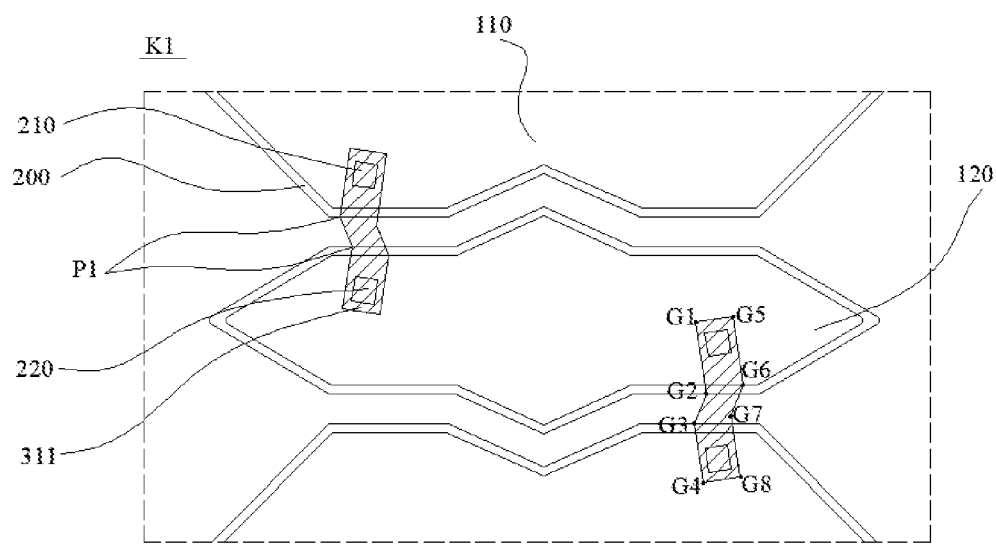
FIG. 16 is yet another alternative enlarged view of the region K1 in FIG. 2.

In yet other possible implementations, FIG. 16 is yet another alternative enlarged view of the region K1 in FIG. 2. Referring to FIG. 16, the connecting bridge 311 may also be polyline-shaped. For example, the connecting bridge 311 may be formed by straight line segments that are connected at two or more bending positions P1. For example, the connecting bridge 311 includes three straight line segments. An orthographic projection, on the insulation layer 200, of a straight line segment at an end of the connecting bridge 311 covers the first opening 210, so as to be connected to the electrode block 110 at the first opening 210; an orthographic projection, on the insulation layer 200, of a straight line segment at another end of the connecting bridge 311 covers the second opening 220, so as to be connected to the connecting pattern 120 at the second opening 220. For example, the first opening 210 or the second opening 220 is a small opening. As another example, the first opening 210 and the second opening 220 are small openings.

In addition, in the straight line segments included in the connecting bridge 311, odd-numbered straight line segments may be substantially parallel; or even-numbered straight line segments may be substantially parallel. For example, two odd-numbered straight line segments (a straight line segment T(G1G2G6G5) and a straight line segment T(G3G4G8G7), where G1, G2, G6, and G5 are four end points of a first-numbered straight line segment, and G3, G4, G8, and G7 are four end points of a third-numbered straight line segment) are substantially parallel.

Except for the features related to the connecting bridge 311 described above, other contents are similar to the embodiments of FIG. 15 described above, and will not be repeated here.

In yet other possible implementations, the connecting bridge may also be in a shape of a wave. What is the same as the polyline-shaped connecting bridge is that, the wave-shaped connecting bridge is formed by a plurality of line segments that are connected at at least one bending position (e.g., one or multiple bending positions). What is different from the polyline-shaped connecting bridge is that, each line segment of the wave-shaped connecting bridge is a curved line segment.

Figures 17, 18:
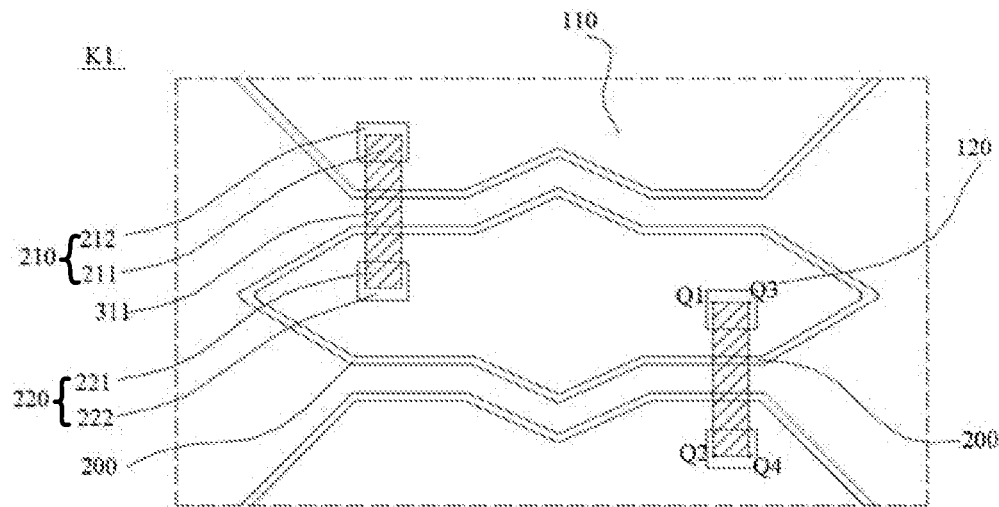
FIG. 17 is yet another alternative enlarged view of the region K1 in FIG. 2.
FIG. 18 is yet another alternative enlarged view of the region K1 in FIG. 2.

FIG. 17 is another alternative enlarged view of the region K1 in FIG. 2. Referring to FIG. 17, some embodiments of the present disclosure provide the touch layer TL. For the touch layer TL, the first opening 210 for connecting the connecting bridge 311 to the electrode block 110 is divided into a first region 211 and a second region 212, and the orthographic projection of the connecting bridge 311 covers the first region 211 and does not cover the second region 212. The orthographic projection of the connecting bridge 311 is the projection of the connecting bridge 311 on the insulation layer 200 in the thickness direction of the touch layer TL. This means that the first region 211 is a portion of the first opening 210 overlapped with the orthographic projection of the connecting bridge 311, and the second region 212 is a portion of the first opening 210 not overlapped with the orthographic projection of the connecting bridge 311. Such the first opening 210 is referred to as a large opening herein, and the large first opening 210 allows a portion of the connecting bridge 311 overlapped and connected with the electrode block 110 to be entirely located within the first opening 210, so that the connecting bridge 311 and the electrode block 110 can be sufficiently connected.

In one possible implementation, an end of the orthographic projection of the connecting bridge 311 is located in the first opening 210, so that an end of the connecting bridge 311 is electrically connected to the electrode block 110 through the first opening 210. For example, for the shape of the connecting bridge 311, reference may be made to the description of the connecting bridge 311 in FIG. 14 described above. At least a portion (the portion or all) of an orthographic projection of an edge L(Q1-Q3) of the connecting bridge 311 on the insulation layer 200 is located in the first opening 210. Q1 and Q3 represent two end points of the edge. In addition, a portion of orthographic projections of two long edges (an edge L(Q1-Q2) and an edge L(Q3-Q4)) of the connecting bridge 311 on the insulation layer 200 may also be located in the first opening 210. Q1 and Q2 represent two end points of one of the long edges, and Q3 and Q4 represent two end points of the other one of the long edges. Such the first opening 210 is referred to as the large opening herein. In this case, a length of the connecting bridge 311 may be relatively short, which helps reduce the visibility of the connecting bridge 311.

With continued reference to FIG. 17, for the touch layer TL, the second opening 220 for connecting the connecting bridge 311 to the connecting pattern 120 is divided into a third region 221 and a fourth region 222, and the orthographic projection of the connecting bridge 311 covers the third region 221 and does not cover the fourth region 222. This means that the third region 221 is a portion of the second opening 220 overlapped with the orthographic projection of the connecting bridge 311, and the fourth region 222 is a portion of the second opening 220 not overlapped with the orthographic projection of the connecting bridge 311. Such the second opening 220 is referred to as a large opening herein. An end of the orthographic projection of the connecting bridge 311 is located in the second opening 220, so that an end of the connecting bridge 311 is electrically connected to the connecting pattern 120 through the second opening 220.

It will be noted that, in the embodiments, except for the features described above, for other features related to the connecting bridge (such as a shape and a size of the connecting bridges, and a distance between adjacent connecting bridges), reference may be made to the embodiments corresponding to FIG. 14, which will not be repeated here.

FIG. 18 is yet another alternative enlarged view of the region K1 in FIG. 2. Referring to FIG. 18, some embodiments of the present disclosure provide the touch layer TL. For features related to the first opening 210 and the second opening 220 (such as a positional relationship between the first opening 210 and the connecting bridge 311, and a positional relationship between the second opening 220 and the connecting bridge 311) in the touch layer TL, reference may be made to the embodiments corresponding to FIG. 17, which will not be repeated here. In addition, for other features related to the connecting bridge (such as a shape and a size of the connecting bridge, and a distance between adjacent connecting bridges) in the touch layer TL, reference may be made to the embodiments corresponding to FIG. 15, which will not be repeated here.

Figure 19:
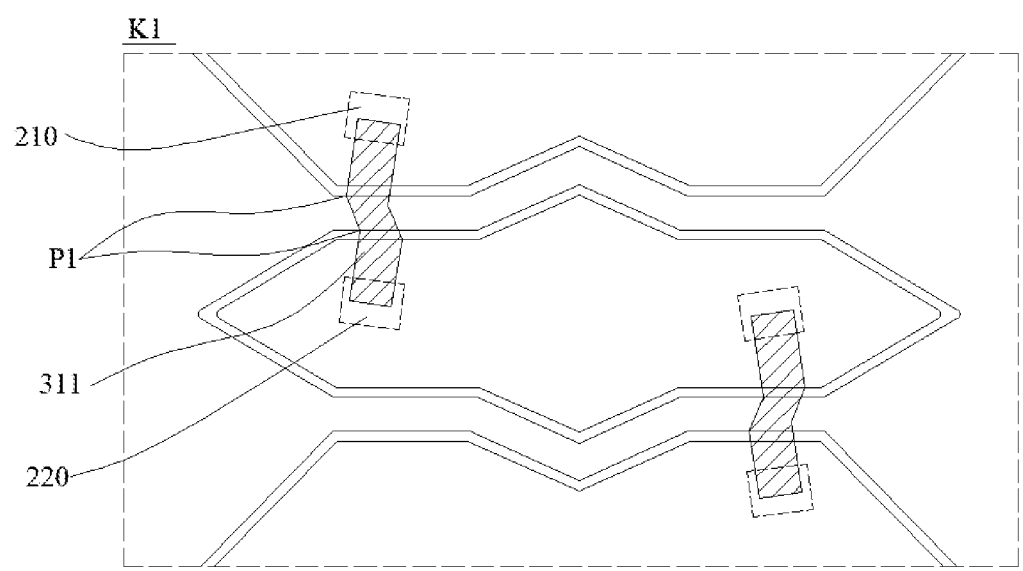
FIG. 19 is yet another alternative enlarged view of the region K1 in FIG. 2.

FIG. 19 is yet another alternative enlarged view of the region K1 in FIG. 2. Referring to FIG. 18, some embodiments of the present disclosure provide the touch layer TL. For features related to the first opening 210 and the second opening 220 (such as a positional relationship between the first opening 210 and the connecting bridge 311, and a positional relationship between the second opening 220 and the connecting bridge 311) in the touch layer TL, reference may be made to the embodiments corresponding to FIG. 17, which will not be repeated here. In addition, for other features related to the connecting bridge (such as a shape and a size of the connecting bridge, and a distance between adjacent connecting bridges) in the touch layer TL, reference may be made to the embodiments corresponding to FIG. 16, which will not be repeated here.

The foregoing descriptions are merely specific implementation manners of the present disclosure, but the protection scope of the present disclosure is not limited thereto, any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A touch layer, comprising:
a first conductive pattern layer including a plurality of electrode blocks that are arranged in a first direction, a second touch electrode strip extending along a second direction, and at least one connecting pattern, wherein the first direction intersects the second direction; the second touch electrode strip passes a space between two adjacent electrode blocks in the plurality of electrode blocks and is insulated from the two adjacent electrode blocks; a connecting pattern in the at least one connecting pattern is located between the two adjacent electrode blocks and is insulated from the second touch electrode strip;
a second conductive pattern layer, wherein the second conductive pattern layer and the first conductive pattern layer are stacked, and the second conductive pattern layer includes at least one bridge group; the plurality of electrode blocks and the at least one connecting pattern are electrically connected by the at least one bridge group, so as to form a first touch electrode strip; the two adjacent electrode blocks and the connecting pattern are electrically connected by a bridge group in the at least one bridge group, and the bridge group includes a plurality of connecting bridges; and
an insulation layer extending between the first conductive pattern layer and the second conductive pattern layer, wherein the insulation layer is provided therein with a plurality of first openings and a plurality of second openings;
wherein an electrode block in the two adjacent electrode blocks is electrically connected to the connecting pattern through at least one connecting bridge in the bridge group, a connecting bridge in the at least one connecting bridge is electrically connected to the electrode block at at least one first opening in the insulation layer and is electrically connected to the connecting pattern at at least one second opening in the insulation layer;
wherein the connecting pattern includes: a first edge, a second edge a third edge and a fourth edge that are sequentially connected end to end, wherein the first edge and the third edge are opposite in the second direction, and the second edge and the fourth edge are opposite in the first direction;
at least one of the first edge, the second edge, the third edge and the fourth edge is in a shape of a polyline, and an edge in the shape of the polyline is a polyline-shaped edge.

2. The touch layer according to claim 1, wherein
a dimension of the connecting pattern in the second direction is greater than a dimension of the connecting pattern in the first direction.

3. The touch layer according to claim 1, wherein
the connecting pattern has at least one convex tooth in the polyline-shaped edge.

4. The touch layer according to claim 3, wherein
the first edge is the polyline-shaped edge, the connecting pattern has at least one first convex tooth in the first edge, and a vertex angle of a first convex tooth in the at least one first convex tooth is an acute angle, wherein the first convex tooth is one of the at least one convex tooth; or the second edge is the polyline-shaped edge, the connecting pattern has at least one second convex tooth in the second edge, and a vertex angle of a second convex tooth in the at least one second convex tooth is an obtuse angle, wherein the second convex tooth is one of the at least one convex tooth; or the third edge is the polyline-shaped edge, the connecting pattern has at least one third convex tooth in the third edge, and a vertex angle of a third convex tooth in the at least one third convex tooth is an acute angle, wherein the third convex tooth is one of the at least one convex tooth; or the fourth edge is the polyline-shaped edge, the connecting pattern has at least one fourth convex tooth in the fourth edge, and a vertex angle of a fourth convex tooth in the at least one fourth convex tooth is an obtuse angle, wherein the fourth convex tooth is one of the at least one convex tooth.

5. The touch layer according to claim 4, wherein
the vertex angle of the first convex tooth in the first edge is in a range of 30° to 90°, inclusive; or
the vertex angle of the second convex tooth in the second edge is in a range of 120° to 145°, inclusive; or
the vertex angle of the third convex tooth in the third edge is in a range of 30° to 90°, inclusive; or
the vertex angle of the fourth convex tooth in the fourth side is in a range of 120° to 145°, inclusive.

6. The touch layer according to claim 1, wherein
the electrode block includes a fifth edge, the fifth edge and the second edge are opposite in the first direction and adjacent in position, and a width of a gap between the fifth edge and the second edge is approximately uniform.

7. The touch layer according to claim 1, wherein
the electrode block includes a sixth edge extending along a third direction, the second touch electrode strip includes a seventh edge extending along the third direction, and the sixth edge and the seventh edge are adjacent in position; the third direction intersects the first direction and the second direction;
at least one of the sixth edge and the seventh edge is in a shape of a polyline.

8. The touch layer according to claim 7, wherein
a bending angle, at a bending position, of a polyline-shaped edge in the sixth edge and the seventh edge is an obtuse angle.

9. The touch layer according to claim 1, wherein
a projection, in a thickness direction of the touch layer, of the connecting bridge on the insulation layer covers a first opening in the at least one first opening; and/or
the projection, in the thickness direction of the touch layer, of the connecting bridge on the insulation layer covers a second opening in the at least one second opening.

10. The touch layer according to claim 1, wherein
a first opening in the at least one first opening is divided into a first region and a second region; a projection, in a thickness direction of the touch layer, of the connecting bridge on the insulation layer is an orthographic projection of the connecting bridge, and the orthographic projection of the connecting bridge covers the first region and does not cover the second region.

11. The touch layer according to claim 10, wherein
an end of the orthographic projection of the connecting bridge is located in the first opening.

12. The touch layer according to claim 1, wherein
a second opening in the at least one second opening is divided into a third region and a fourth region; a projection, in a thickness direction of the touch layer, of the connecting bridge on the insulation layer is an orthographic projection of the connecting bridge, and the orthographic projection of the connecting bridge covers the third region and does not cover the fourth region.

13. The touch layer according to claim 1, wherein
the second touch electrode strip is provided with at least one third opening therein, and the connecting pattern is located in a third opening in the at least one third opening.

14. The touch layer according to claim 13, wherein
a width of a gap between the third opening and the connecting pattern is substantially uniform.

15. The touch layer according to claim 1, wherein
a width of the connecting bridge is substantially uniform, and the connecting bridge is line-shaped, polyline-shaped or wave-shaped.

16. The touch layer according to claim 15, wherein
a bending angle of the polyline-shaped connecting bridge is an obtuse angle.

17. The touch layer according to claim 1, wherein
a distance between any two adjacent connecting bridges in the bridge group in the second direction is greater than or equal to 100 μm.

18. The touch layer according to claim 1, further comprising dummy electrodes, wherein
a dummy electrode in the dummy electrodes is located between the electrode block and the second touch electrode strip.

19. A touch display apparatus, comprising the touch layer according to claim 1.

20. A touch layer, comprising:
a first conductive pattern layer including a plurality of electrode blocks that are arranged in a first direction, a second touch electrode strip extending along a second direction, and at least one connecting pattern, wherein the first direction intersects the second direction; the second touch electrode strip passes a space between two adjacent electrode blocks in the plurality of electrode blocks and is insulated from the two adjacent electrode blocks; a connecting pattern in the at least one connecting pattern is located between the two adjacent electrode blocks and is insulated from the second touch electrode strip;
a second conductive pattern layer, wherein the second conductive pattern layer and the first conductive pattern layer are stacked, and the second conductive pattern layer includes at least one bridge group; the plurality of electrode blocks and the at least one connecting pattern are electrically connected by the at least one bridge group, so as to form a first touch electrode strip; the two adjacent electrode blocks and the connecting pattern are electrically connected by a bridge group in the at least one bridge group, and the bridge group includes a plurality of connecting bridges; and
an insulation layer extending between the first conductive pattern layer and the second conductive pattern layer, wherein the insulation layer is provided therein with a plurality of first openings and a plurality of second openings;

wherein an electrode block in the two adjacent electrode blocks is electrically connected to the connecting pattern through at least one connecting bridge in the bridge group; a connecting bridge in the at least one connecting bridge is electrically connected to the electrode block at at least one first opening in the insulation layer and is electrically connected to the connecting pattern at at least one second opening in the insulation layer; and a first opening in the at least one first opening is divided into a first region and a second region; a projection, in a thickness direction of the touch layer, of the connecting bridge on the insulation layer is an orthographic projection of the connecting bridge, and the orthographic projection of the connecting bridge covers the first region and does not cover the second region.

* * * * *